United States Patent
Ito

(10) Patent No.: US 7,151,812 B2
(45) Date of Patent: Dec. 19, 2006

(54) SAMPLE CLOCK EXTRACTING CIRCUIT AND BASEBAND SIGNAL RECEIVING CIRCUIT

(75) Inventor: Noriyoshi Ito, Chiba Pref. (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 715 days.

(21) Appl. No.: 10/254,643

(22) Filed: Sep. 26, 2002

(65) Prior Publication Data

US 2003/0210756 A1 Nov. 13, 2003

(30) Foreign Application Priority Data

May 10, 2002 (JP) .............................. 2002-134955

(51) Int. Cl.
*H04L 7/00* (2006.01)
(52) U.S. Cl. ........................ 375/368; 375/354; 375/365
(58) Field of Classification Search ................ 375/340, 375/343, 355, 359, 360, 362, 365, 366, 368, 375/372, 316, 354, 371; 370/513, 464, 498, 370/503, 509, 512
See application file for complete search history.

(56) References Cited

U.S. PATENT DOCUMENTS

| | | | | |
|---|---|---|---|---|
| 4,414,676 A | * | 11/1983 | Kraul et al. | ................. 375/368 |
| 5,963,605 A | * | 10/1999 | Yasui | .......................... 375/368 |
| 6,278,718 B1 | * | 8/2001 | Eschholz | .................... 370/503 |
| 6,278,755 B1 | * | 8/2001 | Baba et al. | ................. 375/360 |
| 6,542,563 B1 | * | 4/2003 | Shoji | .......................... 375/366 |
| 2002/0184275 A1 | * | 12/2002 | Dutta et al. | ................. 708/300 |
| 2003/0189673 A1 | * | 10/2003 | Limberg | ..................... 348/725 |

FOREIGN PATENT DOCUMENTS

| | | |
|---|---|---|
| JP | 02-065541 | 3/1990 |
| JP | 05-136780 | 6/1993 |
| JP | 10313290 A | 11/1998 |
| JP | 2001-230765 | 8/2001 |
| JP | 2001-333055 | 11/2001 |

* cited by examiner

*Primary Examiner*—Pankaj Kumar
*Assistant Examiner*—Naheed Ejaz
(74) *Attorney, Agent, or Firm*—VolentineFrancos& Whitt,PLLC

(57) ABSTRACT

A sample clock extracting circuit comprises including a number-of-change point memory, a number-of-change point updating circuit and an output clock phase determining circuit. The number-of-change point memory stores a number-of-change-point information set every N types of clock phases each having a frequency equivalent to N times a symbol transmission rate of an input baseband signal. The number-of-change point updating circuit updates the number-of-change point information stored in the number-of-change point memory about a clock phase related to timing thereof when a rising change point or a falling change point occurs in the baseband signal. The output clock phase determining circuit determines a clock phase directly or indirectly indicative of a sample clock phase for the baseband signal based on the number-of-change-point information stored in the number-of-change point memory.

15 Claims, 14 Drawing Sheets

SAMPLE CLOCK EXTRACTING CIRCUIT AND BASEBAND SIGNAL RECEIVING CIRCUIT

BACKGROUND OF THE INVENTION

The present invention relates to a baseband signal receiving circuit, a sample clock extracting circuit and a word detecting circuit, and is applicable to, for example, a radio signal receiver, which complies with a bluetooth system corresponding to a kind of short-distance communication system.

A bluetooth receiver of a bluetooth system corresponding to a radio communication system using radio signals lying in a 2.4-GHz band has an RFIC (Radio Frequency Integrated Circuit) transceiver for taking out a baseband signal having a symbol transmission rate of 1 MHz from the radio signals lying in the 2.4-GHz band, a baseband receiving circuit for performing packet assembly from the taken-out baseband signal (digital serial signal), etc.

The transmission of the baseband signal is started with a time slot boundary set for each 625 μs. A 4-bit length preamble is first transmitted and synchronous words having 64-bit lengths are then transmitted. Finally, a variable-length payload is transmitted. The baseband receiving circuit of each bluetooth receiver monitors whether each of the 64-bit length synchronous words exists in an input baseband signal. When the synchronous word destined for itself has appeared, the baseband receiving circuit takes in or captures the contents of a payload following it and processes it.

The conventional baseband receiving circuit simply detects only the rising edge and/or falling edge of a received baseband signal to reproduce a clock signal, and samples the baseband signal, based on the clock signal to thereby restore a symbol.

However, the conventional baseband signal receiving circuit is accompanied by a drawback that since it simply detects only the rising edge and/or falling edge of the received baseband signal to thereby reproduce the clock signal, the accuracy of reproduction of the clock signal is degraded and the accurate detection of synchronous word cannot be carried out when noise is contained in the baseband signal and a frequency drift exists in the received baseband signal, and even if the detection of the synchronous word is allowed, a bit error occurs in payload reception subsequent to its detection.

SUMMARY OF THE INVENTION

There has therefore been a demand for a baseband signal receiving circuit capable of properly restoring each symbol in a baseband signal (serial signal), and circuits (sample clock extracting circuit and word detecting circuit) suitable for application to the baseband signal receiving circuit.

A sample clock extracting circuit comprises a number-of-change point memory, a number-of-change point updating circuit and an output clock phase determining circuit. The number-of-change point memory stores a number-of-change-point information set every N types of clock phases each having a frequency equivalent to N (where N is an integer greater than or equal to 2) times a symbol transmission rate of an input baseband signal. The number-of-change point updating circuit updates the number-of-change point information stored in the number-of-change point memory about a clock phase related to timing thereof when a rising change point or a falling change point occurs in the baseband signal. The output clock phase determining circuit determines a clock phase directly or indirectly indicative of a sample clock phase for the baseband signal based on the number-of-change-point information stored in the number-of-change point memory.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE PREFERRED EMBODIMENTS

Preferred embodiments of the present invention will hereinafter be described with reference to the accompanying drawings.

A first embodiment in which a baseband signal receiving circuit and a sample block extracting circuit according to the present invention are applied to a bluetooth receiver, will hereinafter be described in detail with reference to the accompanying drawings.

Figure 1:
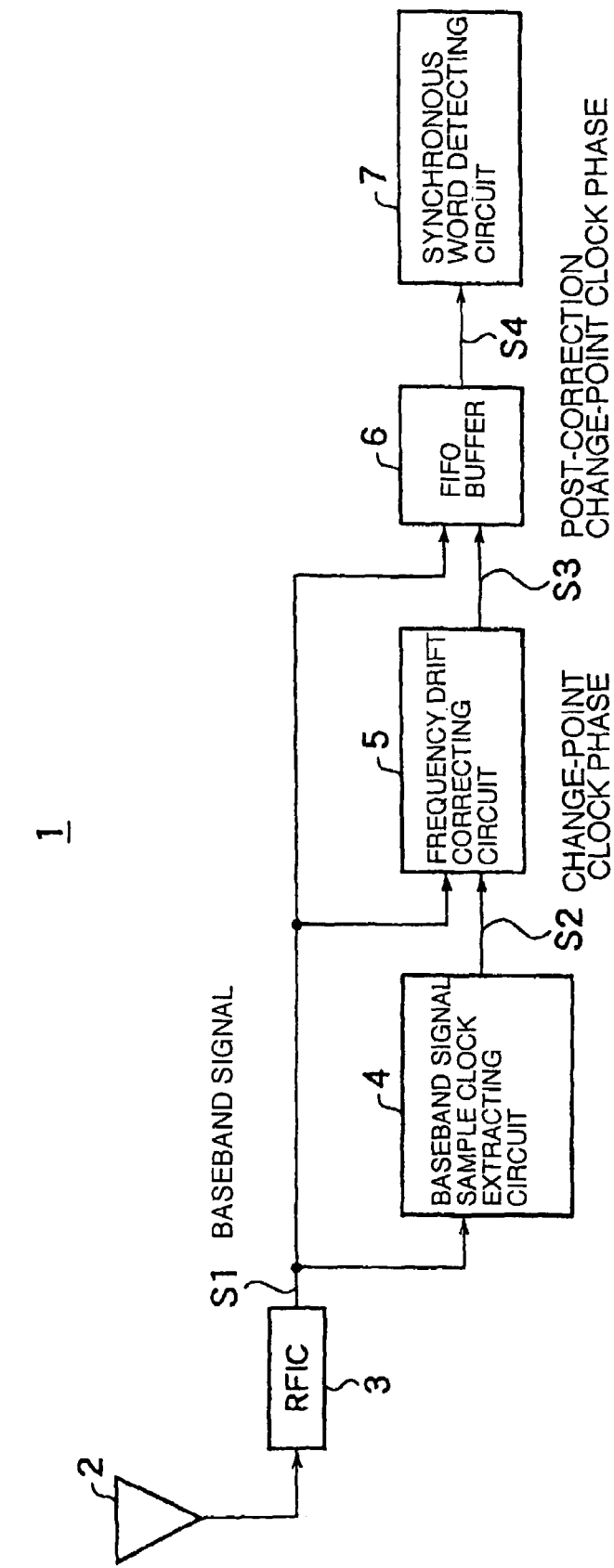
FIG. 1 is a block diagram showing a fragmentary configuration of a bluetooth receiver according to a first embodiment.

FIG. 1 is a block diagram showing a fragmentary configuration of a bluetooth receiver according to the first embodiment.

In FIG. 1, the bluetooth receiver 1 according to the first embodiment includes a receiving antenna 2, an RFIC transceiver 3, a baseband signal sample clock extracting circuit (hereinafter abbreviated appropriately as a "clock extracting circuit") 4, a frequency drift correcting circuit 5, an FIFO (First-in First-out) buffer 6, and a synchronous word detecting circuit 7, etc.

The RFIC transceiver 3 extracts or takes out (demodulates) a baseband signal S1 having a 1-MHZ symbol transmission rate from radio signals lying in a 2.4-GHz band captured by the receiving antenna 2. The resultant baseband signal S1 is supplied to the clock extracting circuit 4, the frequency drift correcting circuit 5 and the FIFO buffer 6.

The clock extracting circuit 4 samples the input baseband signal S1 at a clock frequency equivalent to N (where N is an integer greater than or equal to 2) times the symbol transmission rate, integrates the number of rising change points (rising edges) and/or the number of falling change points (falling edges) of the baseband signal S1 every clock phases from 0 to (N−1), and thereby extracts a clock phase S2 in which the integrated number of change points reaches a maximum. The change-point clock phase S2 is supplied to the frequency drift correcting circuit 5.

The frequency drift correcting circuit 5 is a circuit for correcting a sample frequency of a receive signal so as to match with a transmit frequency where a frequency drift exists between an oscillation frequency on the transmitting side for defining the symbol transmission rate and an oscillation frequency on the receiving side. The frequency drift correcting circuit 5 adjusts a receive frequency (directly change-point clock phase S2) following the baseband signal S1 sent from the transmitting side and outputs a post-correction change-point clock phase S3.

A clock phase determined according to the post-correction change-point clock phase S3 is used for sampling the baseband signal S1, and a sampled symbol is temporarily stored in the FIFO buffer 6.

The FIFO buffer 6 serves not only as a buffer having taken into consideration even a frequency drift but also bears a clock put-to-change or transfer function for effecting writing with a clock obtained in synchronism with the baseband signal S1 and effecting reading with an internal clock generated inside the receiver.

A receive symbol S4 read from the FIFO buffer 6 is supplied to the synchronous word detecting circuit 7. The synchronous word detecting circuit 7 determines whether a synchronous word exists in a reception symbol sequence.

Figure 2:
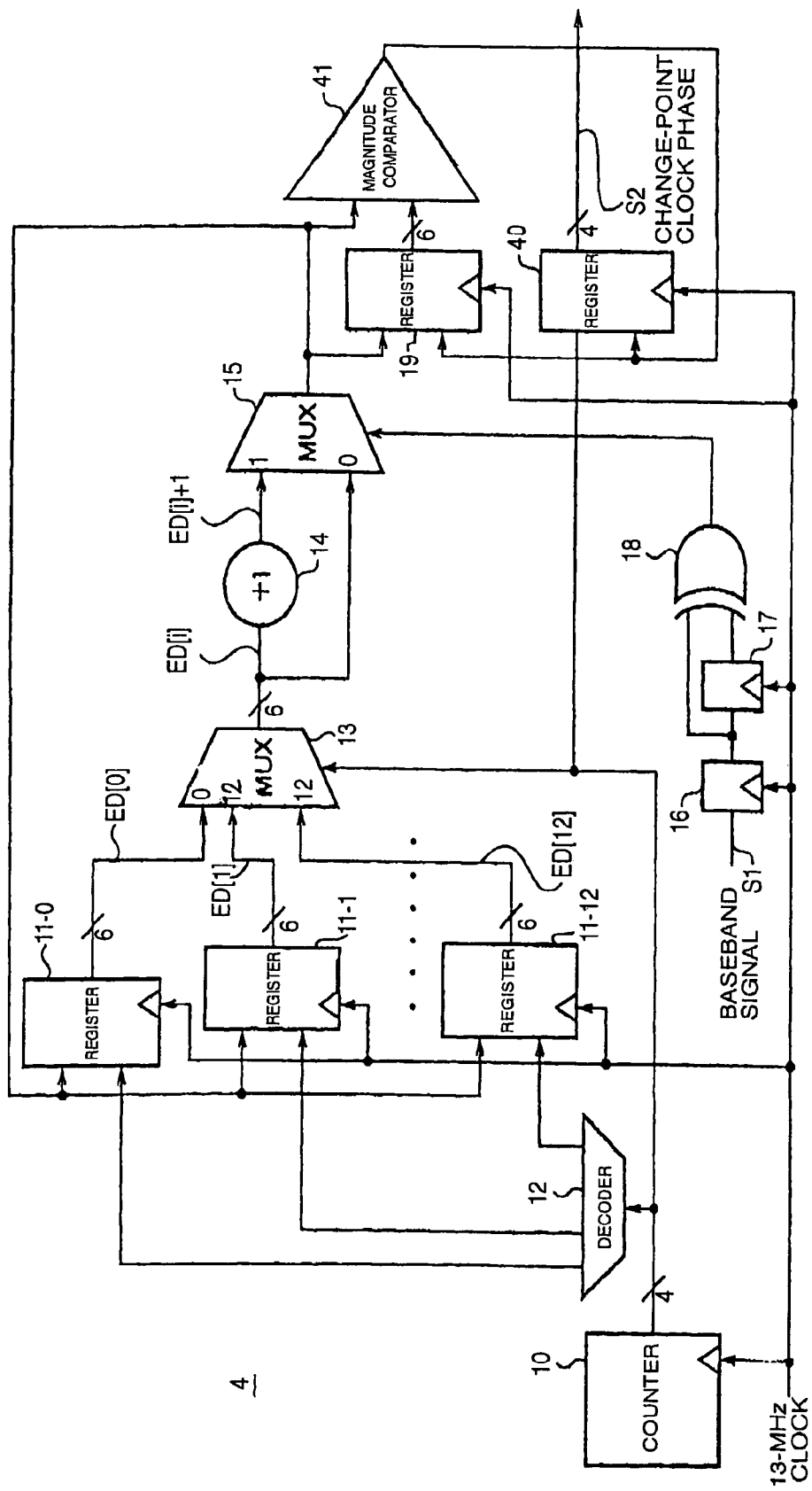
FIG. 2 is a block diagram illustrating a detailed configuration of a baseband signal sample clock extracting circuit illustrated in the first embodiment.

FIG. 2 is a block diagram showing a detailed configuration example of the baseband signal sample clock extracting circuit 4.

As described above, the clock extracting circuit 4 basically samples the baseband signal S1 at the frequency equivalent to N times the symbol transmission rate of the baseband signal and examines points of change in the signal. Therefore, a high-speed clock having a frequency equivalent to N times the symbol transmission rate is supplied to the clock extracting circuit 4 from an unillustrated clock oscillator circuit. The value of 13 or 12 is normally selected as N. Thus, when the baseband signal S1 is transmitted at a 1-MHz symbol transmission rate and 13 is selected as the value of N, a sampling frequency of the baseband signal S1 results in 13 MHz. FIG. 2 shows a configuration example in which 13 is supposed to be selected as the value of N (which is represented as a 13-MHz clock in FIG. 2).

Figure 3:
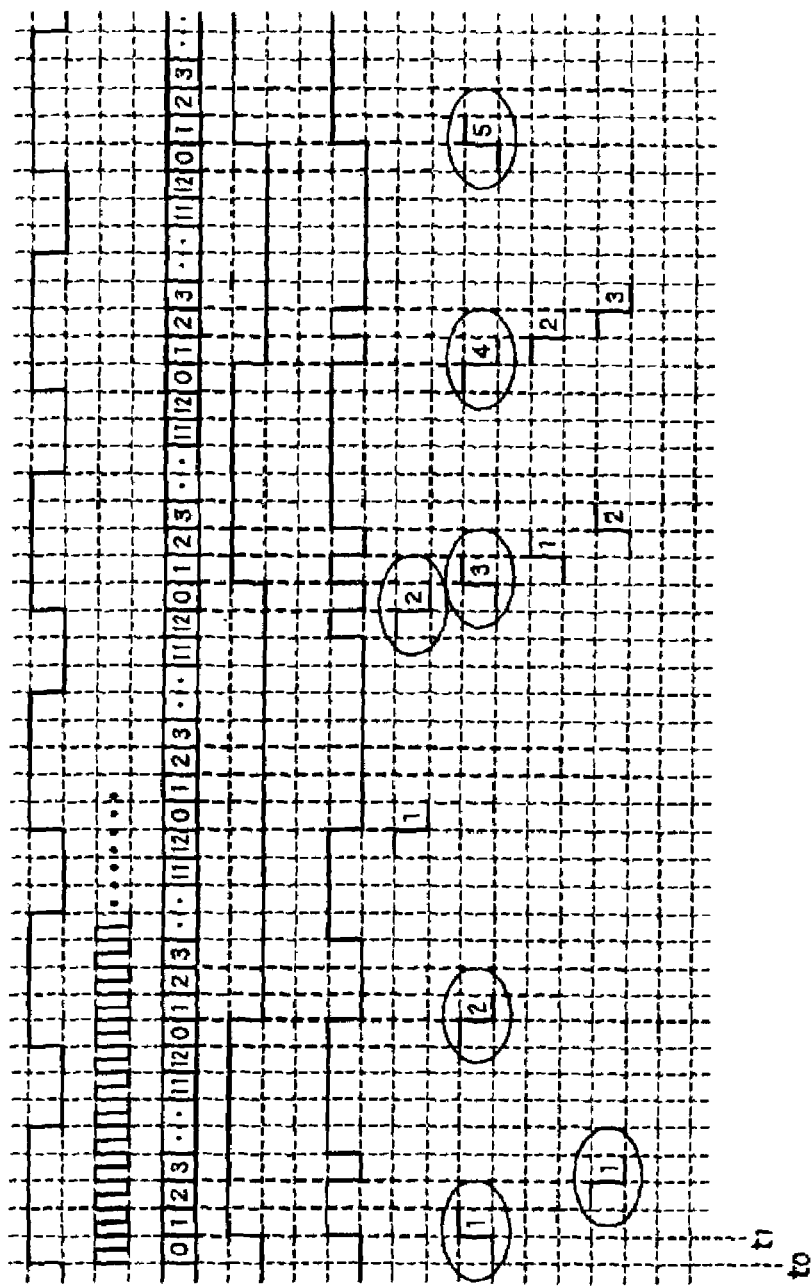
FIG. 3 is a timing chart for describing operations of respective parts of the clock extracting circuit shown in FIG. 2.

Since one symbol period defined by one cycle of a baseband clock shown in FIG. 3(A) is equal to 13 cycles of the 13-MHz clock, the 13-MHz clock can be considered in parts as 13 clock phases (sample clock phases) as shown in FIG. 3(C). Incidentally, FIG. 3 is used for describing specific operations to be described later.

In FIG. 2, a counter (clock phase counter) 10 counts up on a cyclic basis within a range of "0" to "12" each time the 13-MHz clock arrives. A count (given in 4-bit representation because the maximum value is 12: see FIG. 3(B)) of the counter 10 shows the type of the sample clock phase at that time.

Number-of-change points registers 11-0 through 11-12 equal to 13 in total hold therein a cumulative number of change points ED "0" through ED "12" about the 13 clock phases. Decode outputs of a decoder 12 are inputted to load enable input terminals of the number-of-change points registers 11-0 through 11-12. They are selectively set so as to take a load enable state.

When the count of the counter 10 is "0" for example, the number-of-change points register 11-0 related to the "0" clock phase is brought to the load enable state by the decoder 12. When the count of the counter 10 is updated to "1" in response to incoming of the 13-MHz clock, the number-of-change points register 11-1 related to the "1" clock phase is brought to the load enable state by the decoder 12. The number-of-change points registers are selectively brought to the load enable state subsequently in a manner similar to the above. Thus, the registers each held in the load enable state change on a cyclic basis.

The number-of-change points register 11-i (where i corresponds to any of 0 through 12) held in the load enable state loads the output of a multiplexer (MUX) to be described later in synchronism with the 13-MHz clock.

The outputs ED "0" to ED "12" of all the number-of-change points registers 11-0 through 11-12 are inputted to a multiplexer 13 having 13 inputs. A count of the counter 10 for defining the sample clock phase at the present moment is supplied to a control terminal of the multiplexer 13. When the count of the counter 10 indicates an "i" clock phase, the multiplexer 13 selects and outputs the output of the number-of-change points register 11-i related to its clock phase.

In other words, the multiplexer 13 selects or switches the output selecting registers on a cyclic basis as in the case of 11-0, 11-1, 11-2, 11-3, . . . , 11-12, and 11-0 in that order each time the 13-MHz clock is produced. Further, this cyclic change is in sync with the above cyclic change of each register held in the load enable state.

The output of the multiplexer 13 is directly inputted to one input terminal of the two input multiplexer 15 and incremented by 1 by means of a +1 adder 14, followed by input to the other input terminal of the multiplexer 15. The output of an exclusive OR circuit 18 is inputted to a control terminal of the multiplexer 15.

Two latches 16 and 17 and the exclusive OR circuit 18 constitute a circuit for detecting points of changes in the baseband signal S1.

The latch 16 captures or takes in the baseband signal S1 outputted from the RFIC transceiver 3 in synchronism with the 13-MHz clock and outputs it to the latch 17. The latch 17 also takes in the baseband signal latched in the latch 16 in synchronism with the 13-MHz clock.

Thus, the input and output of the latch 17 are made different by a time corresponding to the difference between the adjacent clock phases (e.g., "0" clock phase and "1" clock phase).

The coincidence of logical levels of the phases shifted by the phase-difference minimum time developed in the baseband signal means that no rising and falling change points occur within this time. The difference between the logical levels of the phases shifted by the phase-difference minimum time in the baseband signal means that the rising change point or the falling change point occurs within this time.

Namely, the rising change point or the falling change point can be detected by capturing the discrepancy or non-coincidence between the logical levels of the input and output of the latch 17. The exclusive OR circuit 18 is provided to make a decision as to the coincidence and the non-coincidence.

When the exclusive OR circuit 18 outputs "0" indicative of non-detection of a change point, the multiplexer 15 selects and outputs an output (the number of change points per se up to now at "i" clock phase) of the multiplexer 13. On the other hand, when the exclusive OR circuit 18 outputs "1" indicative of detection of a change point, the multiplexer 15 selects and outputs an output (+1 corresponding to the number of change points up to now at "i" clock phase) of the +1 adder 14.

While the output of the multiplexer 15 is inputted to the number-of-change points registers 11-0 through 11-12 as described above, it is captured by and loaded into the number-of-change points register 11-i held in the load enable state at this time.

The cumulative numbers (numbers of change points) of change points developed in the baseband signal S1 are respectively stored in the number-of-change points registers 11-0 through 11-12 in synchronism with the clock phases related to the registers in the above-described manner.

A maximum number-of-change points register 19 holds a maximum value of the numbers of change points corresponding to 13 in total, which have been retained in the number-of-change points registers 11-0 through 11-12.

Further, a change-point clock phase register 40 holds type information (change-point clock phase S2 in FIG. 1) about the clock phase related to the number-of-change point register which retains therein the maximum value of the numbers of change points.

A comparator 41 makes a decision as to the necessity of renewal of the contents retained in these registers 19 and 40.

The output of the multiplexer 15 and the output of the maximum number-of-change points register 19 are inputted to the comparator 41. The comparator 41 makes a magnitude comparison between these. When the output of the multiplexer 15 is greater than the output of the maximum number-of-change points register 19, the comparator 41 gives instructions for updating of the registers 19 and 40 (brings them into the load enable state).

The output of the multiplexer 15 has been inputted to the maximum number-of-change points register 19. When the instructions for its updating is issued from the comparator 41, the maximum number-of-change points register 19 takes in and holds the output of the multiplexer 15 in synchronism with the 13-MHz clock.

The count of the counter 10 has been inputted to the change-point clock phase register 40. When the instructions for its updating is issued from the comparator 41, the change-point clock phase register 40 takes in and holds the count of the counter 10 in synchronism with the 13-MHz clock.

In an ideal baseband signal, the interval between rising change points or falling change points is equal to an integral multiple of one symbol period. Therefore, only one clock phase of 13 clock phases obtained by dividing one symbol period into thirteen always serves as a phase at the boundary between symbols. A rising change point or a falling change point occurs in the symbol boundary in which switching to the symbol or code has been made. Namely, only the number of change points at a given clock phase is updated if an ideal signal is given, and the numbers of change points at other clock phases respectively result in 0. A clock phase having the effective number of change points represents the phase of the symbol boundary in the baseband signal.

Although the baseband signal is not ideal, the clock phase in which the number of change points is maximum, can be taken as being indicative of the phase of the symbol boundary in the baseband signal.

The configuration of the baseband signal sample clock extracting circuit 4 shown in FIG. 2 is constructed based on the above method of thinking.

The operation of the clock extracting circuit 4 shown in FIG. 2 will next be described specifically with reference to FIG. 3.

Incidentally, all of the registers 11-0 through 11-12, 19 and 40 have been regarded as being cleared to 0 in an initial state indicated at a time to in FIG. 3. FIG. 3(D) represents a baseband signal on the transmitting side, and FIG. 3(E) represents a baseband signal S1 (see FIGS. 1 and 2) on the receiving side. The baseband signal S1 on the receiving side has been mixed with noise.

When the count of the counter 10 changes to "0" from an initial state indicated at a time to in response to a 13-MHz clock, the multiplexer 13 selects the number of change points (0 at this time) corresponding to the output of the register 11-0. Thus, the number of change points 0 used up to now and the number of change points 1 subjected to one increment are inputted to the multiplexer 15. Since no change points occur in the baseband signal S1 at this time as shown in FIG. 3(E), the multiplexer 15 selects the number of change points 0 used up to now.

Since the count of the counter 10 is given as "0", the register 11-0 is brought to the load enable state under the function of the decoder 12 and hence the number of change points 0 used up to now is reloaded into the register 11-0 as it is.

The output (number of change points 0) of the multiplexer 15 and the output (maximum number of change points 0) of the maximum number-of-change points register 19 are compared with each other. Since, however, the output (number of change points 0) of the multiplexer 15 is greater than the output (maximum number of change points 0) of the maximum number-of-change points register 19, a process for updating the registers 19 and 40 is executed, so that the value held by the maximum number-of-change points register 19 is updated to the output (number of change points 0) of the multiplexer 15, and the value retained in the change-point clock phase register 40 is updated to the count ("0" clock phase) of the counter 10.

When the count of the counter 10 changes to "1" in response to the next 13-MHz clock, the multiplexer 13 selects the number of change points (0 at this time) corresponding to the output of the register 11-1. Thus, the number of change points 0 used up to now and the one-incremented number of change points 1 are inputted to the multiplexer 15. Since the change point occurs in the baseband signal S1 at this time as shown in FIG. 3(E), the multiplexer 15 selects the one-incremented number of change points 1.

Since the count of the counter 10 is "1", the register 11-1 is brought to the load enable state by the function of the decoder 12, so that the one-incremented number of change points 1 is loaded into the register 1-11.

The output (number of change points 1) of the multiplexer 15 and the output (maximum number of change points 0) of the maximum number-of-change points register 19 are compared with each other. Since, however, the output (number of change points 1) of the multiplexer 15 is greater than the output (maximum number of change points 0) of the maximum number-of-change points register 19, a process for updating the registers 19 and 40 is executed, so that the value held by the maximum number-of-change points register 19 is updated to the output (number of change points 1) of the multiplexer 15, and the value retained in the change-point clock phase register 40 is updated to the count ("1" clock phase) of the counter 10.

A similar process is executed subsequently each time a 13-MHz clock is produced. The contents of the number-of-change points registers 11-0~11-12, the maximum number-of-change points register 19 and the change point clock phase register 40 are updated according to the presence or absence of the rising change points and/or the falling change points of the baseband signal S1.

The noise-based rising and falling change points due to noise are also contained in the baseband signal S1, and the numbers of change points related to clock phases other than the clock phases at the original rising and falling change points, and the like are counted. However, when a certain degree of time has elapsed even in such a case, the numbers of change points at clock phases ("1" clock phases in FIG. 3) of the original rising and falling change points become maximum, and hence the proper information ("1" clock phase) is outputted as a change-point clock phase S2.

Incidentally, each of numerical values lying within portions surround by circles in FIG. 3 indicates a value immediately after the updating of the maximum number-of-change points register 19. A clock phase at this time represents the contents (change-point clock phase S2) stored in the change-point clock phase register 40.

Next, consideration will be given to the required numbers of bits for the numbers of change points retained in the number-of-change points registers 11-0 through 11-12, and the maximum number of change points retained in the maximum number-of-change points register 19.

There may be a case in which times in seconds are normally required for retrieval of each packet. Since a symbol transmission rate is 1 MHz assuming that retrieval is being done continuously for one second, for example, there is a need to take values ranging from 1 to 1,000,000 as the number of change points and the maximum number of change points. There is a need to provide 14 registers 11-0 through 11-12 and 19 having a 20-bit length (the maximum value expressible by 20 bits is defined as 1,048,576, and 20 bits are needed to represent 1,000,000).

When the fourteen 20-bit length registers are required, the number of required gates increases and a burden is excessively imposed in terms of hardware/implement.

Therefore, the bit length for each of the numbers of change points and the maximum number of change points may preferably be set to about 6 bits as shown in FIG. 2.

When the bit length is set to 6 bits, the maximum value expressible by the 6-bit length might be reached within the time required to execute a packet retrieval process. As countermeasures against to it, may be mentioned, the following methods. When the maximum number of change points held in the maximum number-of-change points register 19 has reached 63 corresponding to the maximum value expressible by the 6-bit length, the values of the registers 11-0 through 11-12, and 19 are divided by, for example, 4 in unison (such by-4 division can be realized by shifting 2 bits to the low-order side according to the configurations of the registers). Since the values are divided by 4 in unison, the relationship in magnitude among the numbers of change points retained in the number-of-change point registers 11-0 through 11-12, and the maximum number of change points held in the maximum number-of-change points register 19 is maintained.

Incidentally, such configurations or functions may preferably be added to the configuration shown in FIG. 2.

The operation of the frequency drift correcting circuit 5 will next be explained in consideration of the clock extracting circuit 4 shown in FIG. 2.

The frequency drift correcting circuit 5 corrects a change-point clock phase S2 from the clock extracting circuit 4 (change-point clock phase register 40) while referring to the rising and falling change points of the baseband signal S1.

FIGS. 4 through 8 are timing charts showing the relationship between symbol change points and the correction of each clock phase by the frequency drift correcting circuit 5. Incidentally, each of the values of "m" in sampling clock phases in FIGS. 4 through 8 indicates a change-point clock phase S2 (clock phase for the maximum number of change points) outputted from the clock extracting circuit 4. As the configuration of detecting the rising and falling change points of the baseband signal S1, the detection configuration (latches 16 and 17 and exclusive OR circuit 18) in the clock extracting circuit 4 referred to above may be utilized. Alternatively, a similar configuration may be provided inside the frequency drift correcting circuit 5.

Figure 4:
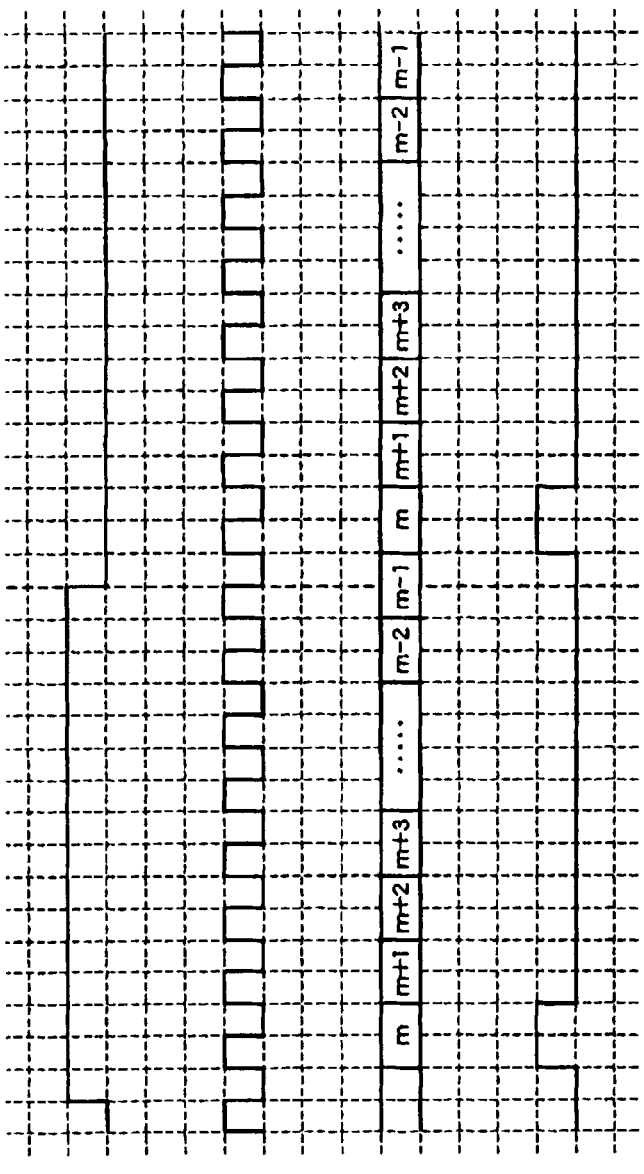
FIG. 4 is a timing chart (1) for describing an operation of a frequency drift correcting circuit employed in the first embodiment.

FIG. 4 shows a case in which a baseband signal S1 (see FIG. 4(A)) changes in synchronism with a change-point clock phase S2 (see FIG. 4(C)). In other words, FIG. 4 shows a case in which the baseband signal S1 and an internal clock in the receiver are in sync with each other. In this case, the frequency drift correcting circuit 5 does not execute a correction to the change-point clock phase S2 and sets the same value as the change-point clock phase S2 as the value of a post-correction change-point clock phase S3.

Incidentally, FIG. 4(B) shows a 13-MHz clock, and FIG. 4(D) shows a detect signal indicative of change points in the baseband signal. Since a change point is developed in the baseband signal S1 during a period of a "m−1" clock phase, the change-point detect signal becomes significant during a period of an "m" clock phase in FIG. 4. Here, the speed or rate of detecting each change point in the baseband signal S1 may be set according to the application of a clock (e.g., 24 MHz) faster than 13 MHz.

Figure 5:
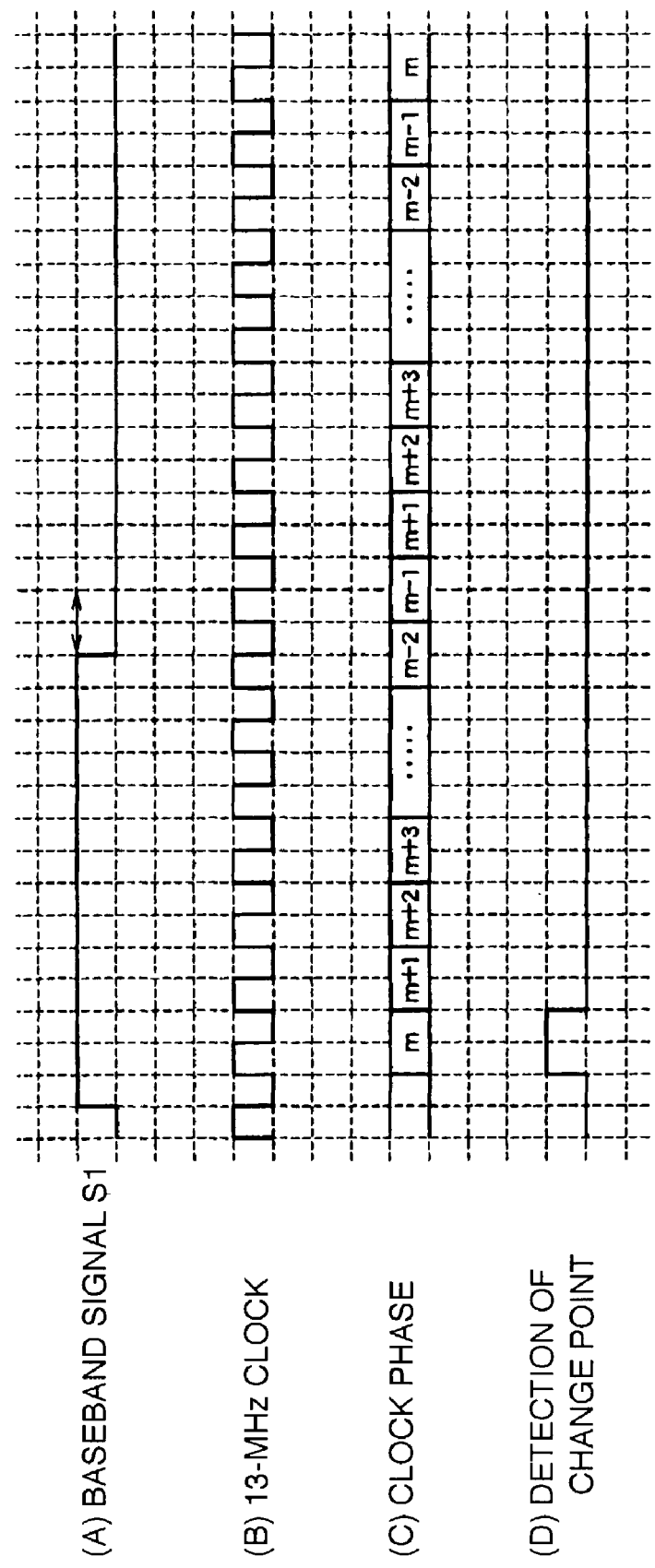
FIG. 5 is a timing chart (2) for describing another operation of the frequency drift correcting circuit employed in the first embodiment.

FIG. 5 shows a case in which a change point of a baseband signal S1 is changed one cycle before the change-point clock phase S2. In other words, FIG. 5 shows a case in which a deviation between the baseband signal S1 and the internal clock of the receiver is a —1 cycle. Such a phenomenon occurs where, for example, a symbol frequency (clock frequency on the transmitting side) of the baseband signal S1 drifts in a direction in which the symbol frequency is slightly higher than a clock frequency of the receiving circuit.

The value of clock phase information (which makes use of the output of the counter 10 in the clock extracting circuit 4, for example, or which is formed by a configuration similar to it) shown in FIG. 5(C), which changes in synchronism with a 13-MHz clock when a change-point detect signal shown in FIG. 5(D) becomes significant, is reduced by 1 from the value of the change-point clock phase S2 sent from the clock extracting circuit 4, whereby the frequency drift correcting circuit 5 is capable of recognizing the above-described change developed one cycle before the change-point clock phase. In such a case, the frequency drift correcting circuit 5 reduces the value of a post-correction change-point clock phase S3 by one from the value of the input change-point clock phase S2. However, when the value of the input change-point clock phase S2 is 0, the frequency drift correcting circuit 5 sets the value of the post-correction change-point clock phase S3 to 12. Further, a sequence of changes in the value of each internally-controlled clock phase is also corrected by —1 cycle as shown in FIG. 5(C) (e.g., it depends on a re-load process where the clock phase information is formed through the use of the counter).

Figure 6:
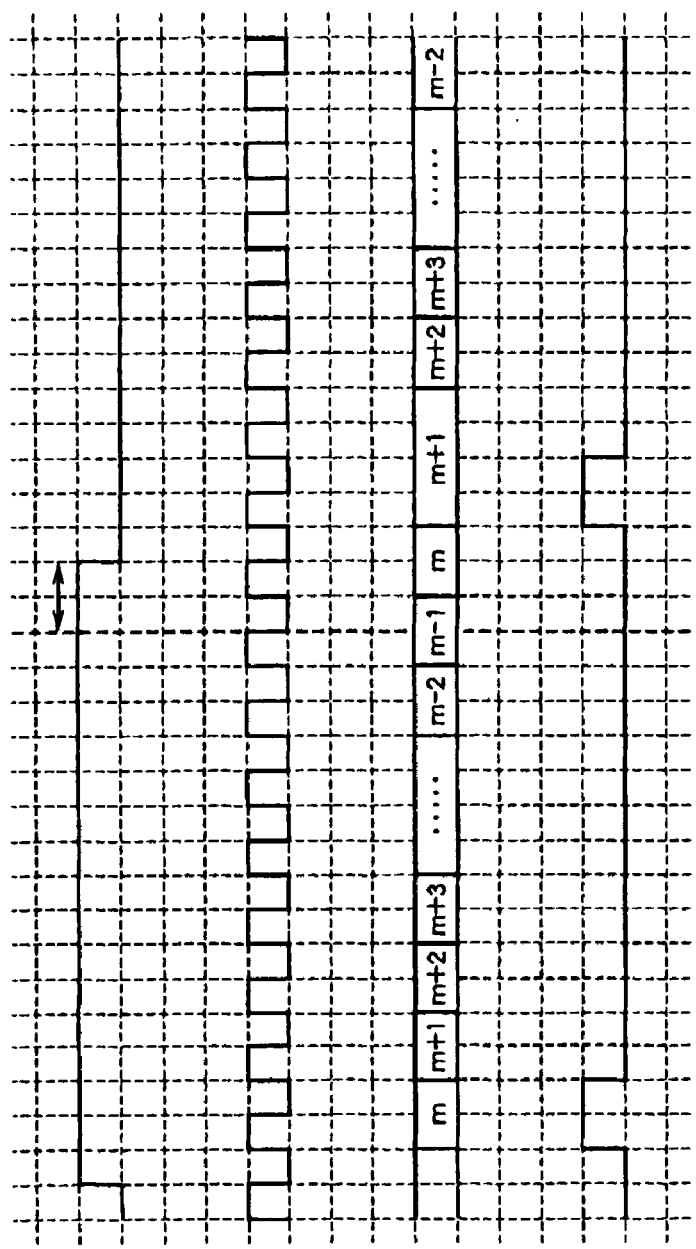
FIG. 6 is a timing chart (3) for describing a further operation of the frequency drift correcting circuit employed in the first embodiment.

FIG. 6 shows a case in which a change point of a baseband signal S1 is changed one cycle after a change-point clock phase S2. In other words, FIG. 6 shows that a deviation between the baseband signal S1 and the internal clock of the receiver is a 1 cycle. Such a phenomenon occurs where a symbol frequency (clock frequency on the transmitting side) of the baseband signal S1 drifts in a direction in which the symbol frequency is slightly lower than a clock frequency of the receiving circuit.

In such a case, the frequency drift correcting circuit 5 increases the value of a post-correction change-point clock phase S3 by one from the value of the input change-point clock phase S2. However, when the value of the input change-point clock phase S2 is 12, the frequency drift correcting circuit 5 sets the value of the post-correction change-point clock phase S3 to 0. Further, a sequence of changes in the value of each internally-controlled clock phase is also corrected by 1 cycle as shown in FIG. 6(C).

FIGS. 5 and 6 referred to above respectively show the correction of the change-point clock phase S2 where the deviation between the baseband signal S1 and the internal clock of the receiver falls within a deviation of ±1 cycle. The correction of such a change-point clock phase may be expanded to a deviation of ±2 cycles as shown in FIGS. 7 and 8.

Figure 7:
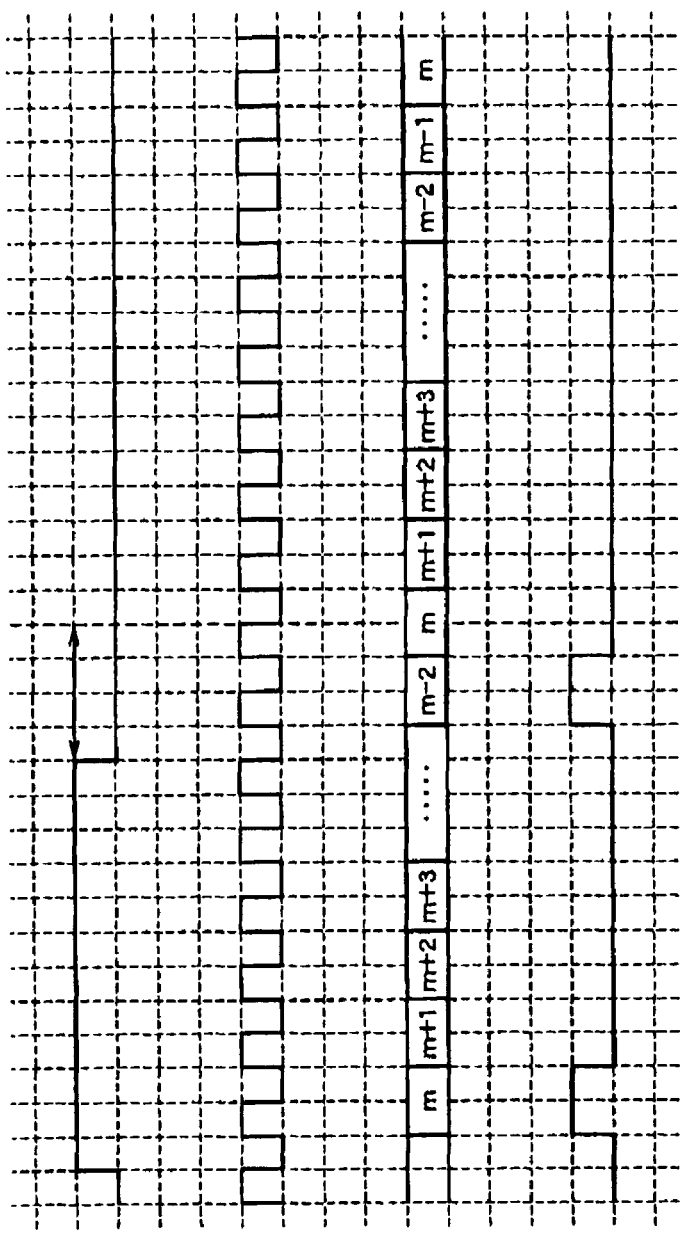
FIG. 7 is a timing chart (4) for describing a still further operation of the frequency drift correcting circuit employed in the first embodiment.

FIG. 7 shows a case in which a change point of a baseband signal S1 is changed two cycles before a change-point clock phase S2. Even in such a case, the frequency drift correcting circuit 5 decreases the value of a post-correction change-point clock phase S3 by one from the value of the input change-point clock phase S2. The reason why the correction of the change-point clock phase S2 remains held at −1 even though the detected phase shift is developed two cycles before the change-point clock phase S2, is that the change point has a possibility of being caused by noise, and there is a possibility that the correction of the change-point clock phase more than necessary depending on the noise will cause out of sync in the course of symbol reception.

Figure 8:
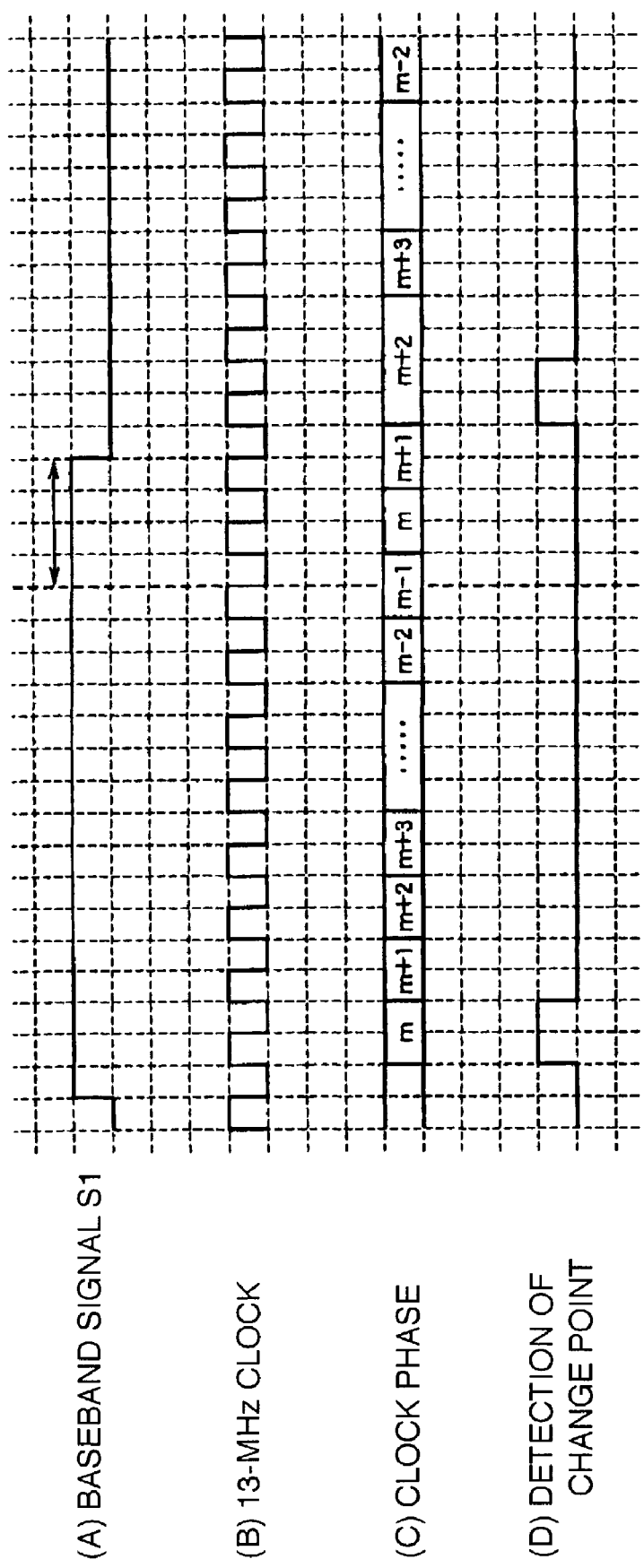
FIG. 8 is a timing chart (5) for describing a still further operation of the frequency drift correcting circuit employed in the first embodiment.

FIG. 8 shows a case in which a change point of a baseband signal S1 is changed after two cycles of a change-point clock phase S2 in reverse. Even in such a case, the frequency drift correcting circuit 5 increases the value of a post-correction change-point clock phase S3 by 1 from the value of the input change-point clock phase S2 according to a method of thinking similar to FIG. 7.

Incidentally, when a "0" symbol is held continuously or a "1" symbol is held continuously, for example, no change point occurs in the baseband signal S1 even at the boundary of a symbol period. When no change point occurs in the baseband signal S1 before and after the timing for the change-point clock phase S2, the frequency drift correcting circuit 5 outputs the change-point clock phase S2 as it is as the post-correction change-point clock phase S3.

A change point might occur in the noise-mixed baseband signal S1 with timing which substantially deviates from the change-point clock phase S2. The frequency drift correcting circuit 5 neglects a change point shifted ±3 cycles or more from the change-point clock phase S2 and does not execute a correcting process.

The post-correction change-point clock phase S3 is transmitted to the FIFO buffer 6 for temporarily storing the baseband signal S1.

The length of the FIFO buffer 6 is determined by the value of an allowable frequency drift. While the length of a packet corresponding to a packet longest in bluetooth is about 3 ms, for example, the length of the FIFO buffer 6 is needed within a range of ±5 symbols if a frequency drift up to 5 µs is allowed during this section of about 3 ms. Therefore, the FIFO buffer 6 is brought to a length of 11 symbols.

Here, the post-correction change-point clock phase S3 indicates a change-point phase of a symbol.

In order to execute sampling with a phase having less possibility in which a symbol changes stably (to perform writing to the FIFO buffer 6), the sampling of the baseband signal S1 is carried out at an intermediate point between the post-correction change-point clock phase S3 and the next change-point clock phase S3. When the sampling thereof is made in any of 13 clock phases defined by a 13-MHz clock, for example, a sampling clock phase relative to the baseband signal S1 is set to the following value:

(post-correction change-point clock phase S3+6) modulo 13

Here, 6 is added to the post-correction change-point clock phase S3 (7 may be added thereto) to determine an intermediate point (13/2≈6 or 7) up to the phase of the next change point (after 13 clock cycles). Further, the "modulo 13" is used to distinguish the 13 (13 types of) phases from one another by "0" through "12".

The baseband signal S1 is sampled in the above-described positions of clock phases and stored in the FIFO buffer 6.

The FIFO buffer 6 having the 11-symbol length awaits that the first 5 symbols are stored after the commencement of signal reception (i.e., a write/read control circuit in the FIFO buffer 6 performs only writing but does not perform reading). This is because even if a frequency drift is produced in either plus or minus direction to thereby increase or decrease the number of symbols stored in the FIFO buffer 6, the original number of symbols is set to 5 so that the discarding of each symbol does not occur until the completion of a packet.

When the length of the stored symbol has reached 5, the FIFO buffer 6 (its write/read control circuit) performs reading from the FIFO buffer 6 according to an internal clock of 1 MHz and outputs it to the synchronous word detecting circuit 7 as a receive signal S4.

Subsequently, the FIFO buffer 6 writes the baseband signal S1 in a clock phase based on the post-correction sampling clock phase S3 outputted from the frequency drift correcting circuit 5, performs signal reading in synchronism with the internal clock of 1 MHz and outputs the read receive signal (sequence) S4 to the synchronous word detecting circuit 7.

The synchronous word detecting circuit 7 makes a decision as to the coincidence of each synchronous word with respect to an input receive signal (baseband signal) S4.

Figure 9:
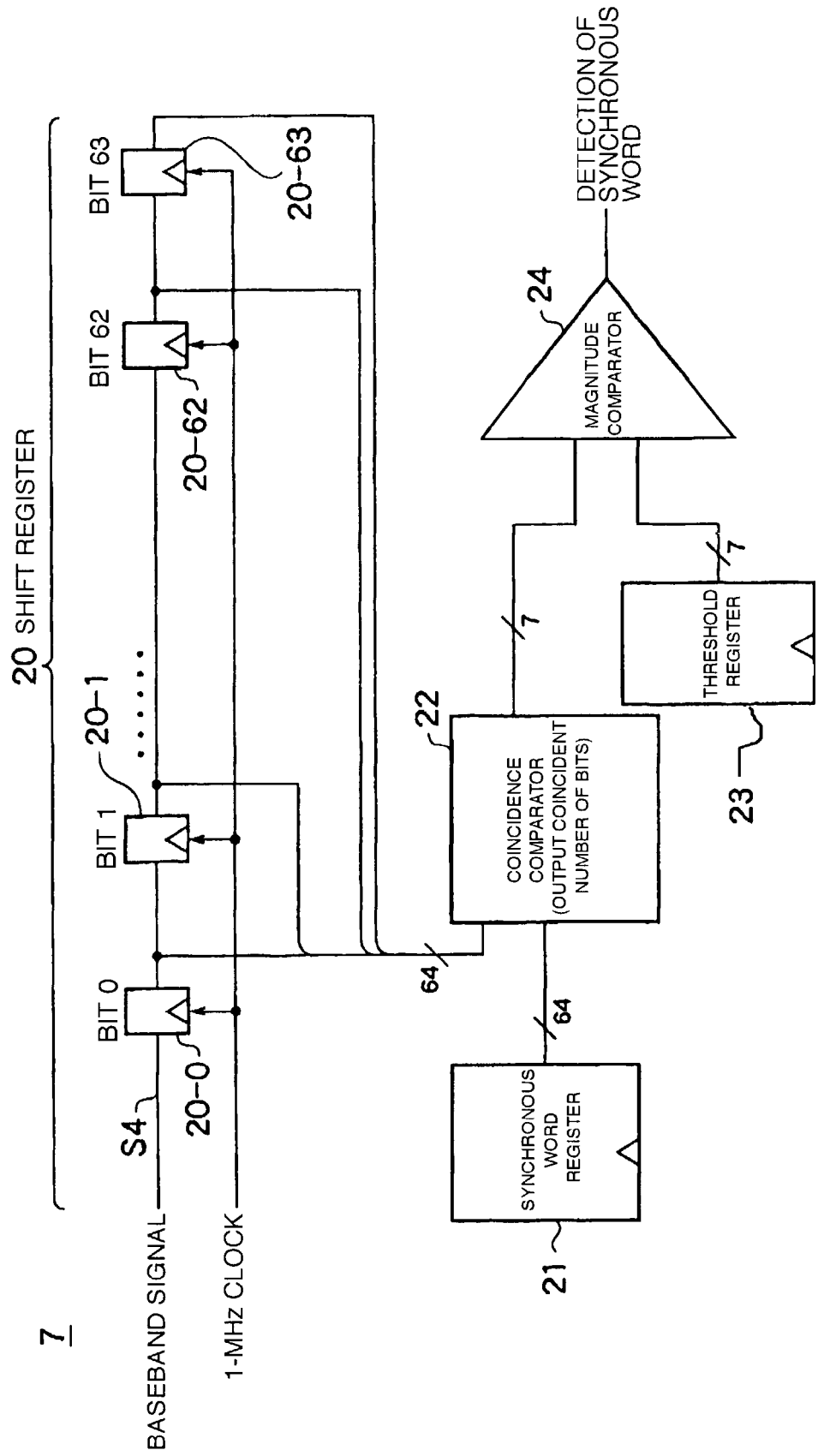
FIG. 9 is a block diagram showing a detailed configuration of a synchronous word detecting circuit illustrated in the first embodiment.

FIG. 9 is a block diagram showing a detailed configuration of the synchronous word detecting circuit 7 illustrated in the first embodiment. In FIG. 9, the synchronous word detecting circuit 7 has a 64-bit length shift register 20, a synchronous word register 21, a coincidence comparator 22, a threshold register 23 and a size or magnitude comparator 24, etc.

A receive signal (baseband signal) S4 inputted from the FIFO buffer 6 is loaded into the 64-bit length shift register 20 while being sequentially shifted in synchronism with a 1-MHz clock, and taken out in parallel from respective taps 20-1 through 20-63 of the shift register 20, followed by supply to the coincidence comparator 22.

The coincidence comparator 22 is supplied even with 64 bits (64 symbols) of the normal synchronous words stored in the synchronous word register 21. The coincidence comparator 22 compares 64 bits sent from the shift register 20 and the normal synchronous words (64 bits) stored in the synchronous word register 21 in bit position units thereof and supplies the number of bits (7-bit representation because of 64 at maximum) in which logical values coincide, to the magnitude comparator 24.

The magnitude comparator 24 is also supplied with the number of threshold coincidence bits for detection and determination of each synchronous word, which are stored in the threshold register 23. When the number of coincidence bits sent from the coincidence comparator 22 exceeds the number of threshold coincidence bits outputted from the threshold register 23, the magnitude comparator 24 makes a synchronous word detect signal significant.

The number of threshold coincidence bits is set to 50 to 64 or so according to the situation of received radio waves, for example.

Subsequently to the detection of each synchronous word, the output of the FIFO buffer 6 is suitably processed as a payload.

According to the first embodiment as described above, since a clock phase of a change point of each symbol is determined from a baseband signal while confirming a plurality of positions of change points of the baseband signal, a clock phase synchronized with each change point of the baseband signal can be determined accurately. As a result, the clock phase for sampling becomes accurate, and the symbol can be reproduced accurately even if noise is mixed into the baseband signal.

Since there is provided a circuit for detecting a change in the phase of the baseband signal due to a frequency drift from a change-point clock phase and change points of the baseband signal and correcting it, a receiver resistant even to the frequency drift can be realized.

Further, since the detection of a synchronous word is carried out at a symbol transmission rate, a synchronous word detecting circuit can be reduced in configuration and power consumption can be cut down.

Figure 10:
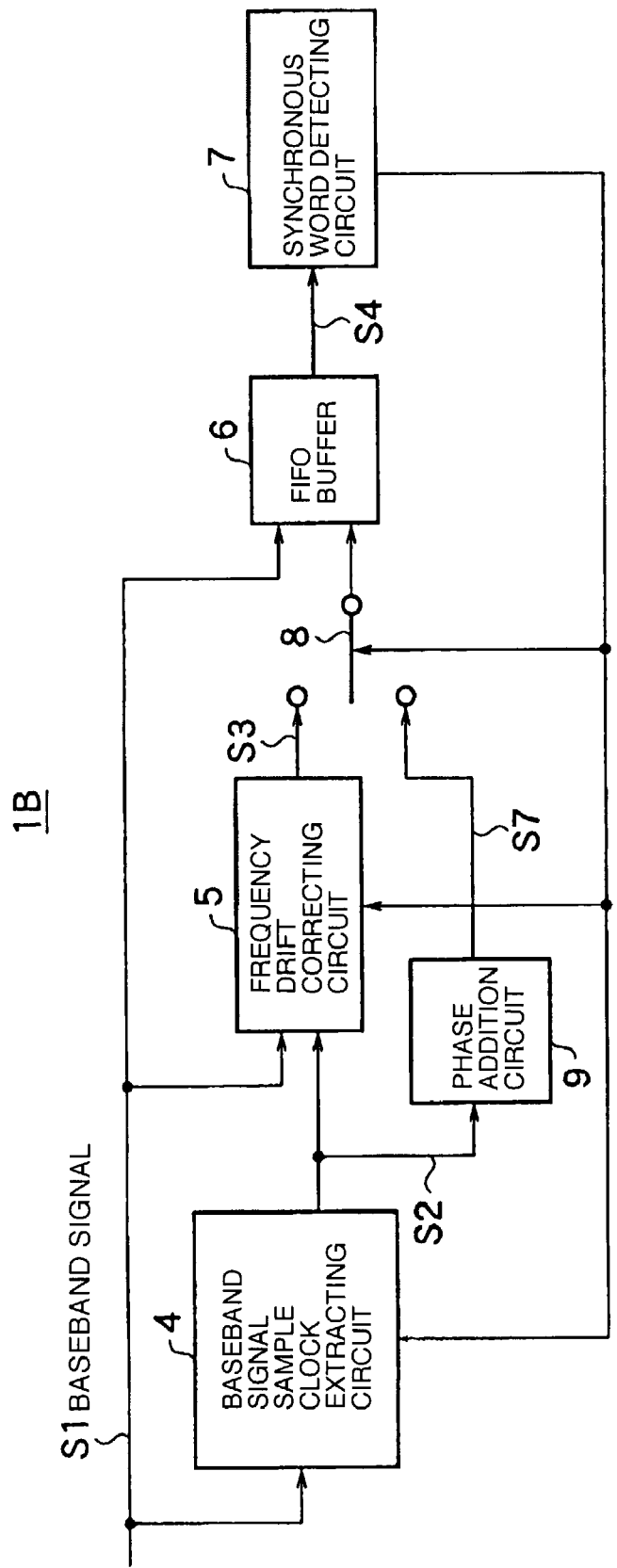
FIG. 10 is a block diagram illustrating a fragmentary configuration of a bluetooth receiver according to a second embodiment.

A second embodiment in which the present invention is applied to a bluetooth receiver, will next be described in detail with reference to the accompanying drawings. Now, FIG. 10 is a block diagram showing a fragmentary configuration of the bluetooth receiver according to the second embodiment. Components identical or corresponding to those shown in FIG. 1 according to the first embodiment referred to above are identified by the same reference numerals.

As shown in FIG. 10, the bluetooth receiver 1B according to the second embodiment includes a change-point clock phase selector 8 in addition to a baseband signal sample clock extracting circuit 4, a frequency drift correcting circuit 5, an FIFO buffer 6 and a synchronous word detecting circuit 7, etc.

In the second embodiment as well, information about the detection of each synchronous word by the synchronous word detecting circuit 7 is supplied to the clock extracting circuit 4, the frequency drift correcting circuit 5 and the change-point clock phase, selector 8.

In the second embodiment, the frequency drift correcting circuit 5 is deactivated until the synchronous word detecting circuit 7 detects a synchronous word, in order to further reduce power consumption. When the frequency drift correcting circuit 5 is deactivated, a change-point clock phase S2 outputted from the clock extracting circuit 4 is supplied to the FIFO buffer 6 via a phase addition circuit 9 and the change-point clock phase selector 8 to thereby activate the FIFO buffer 6 and the synchronous word detecting circuit 7. Here, the phase addition circuit 9 is an adder circuit for inputting the value of the change-point clock phase S2 outputted from the sample clock extracting circuit 4 and determining the following sampling clock phase S4.

When the synchronous word is detected by the synchronous word detecting circuit 7, the clock extracting circuit 4 is next deactivated and the frequency drift correcting circuit 5 is started up to supply a post-correction change-point clock phase S3 outputted from the frequency drift correcting circuit 5 to the FIFO buffer 6 via the change-point clock phase selector 8, thereby operating the FIFO buffer 6 and the synchronous word detecting circuit 7. Incidentally, the frequency drift correcting circuit 5 performs a process for forming the post-correction change-point clock phase S3 upon its operation, based on the value of the change-point clock phase S2 outputted from the clock extracting circuit 4 upon the synchronous word detection.

According to the second embodiment, a reduction in power consumption can be expected more than expected in the first embodiment. Incidentally, the bluetooth receiver is often mounted in a cellular phone or the like and a demand for a reduction in power consumption increases.

A third embodiment in which a baseband signal receiving circuit and a word detecting circuit according to the present invention are applied to a bluetooth receiver, will next be described in detail with reference to the accompanying drawings.

Figure 11:
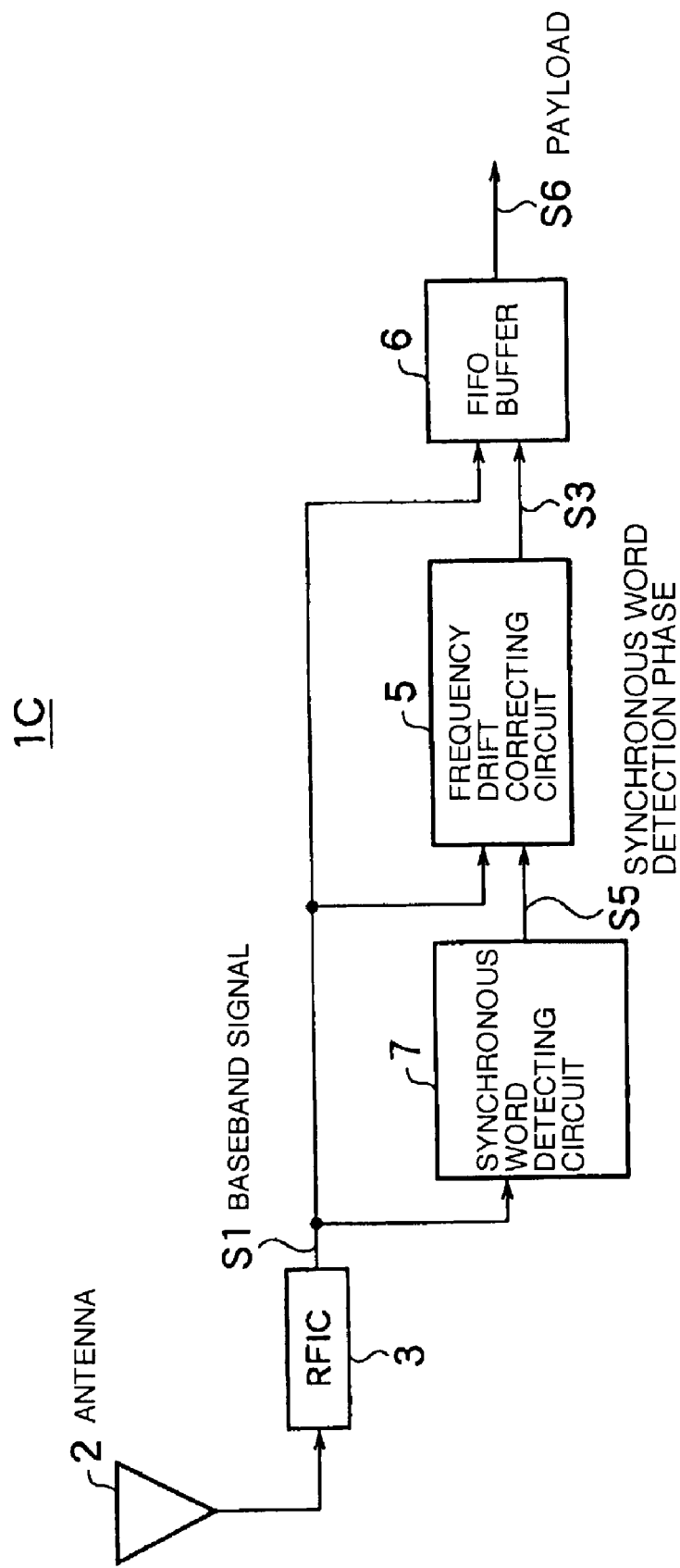
FIG. 11 is a block diagram showing a fragmentary configuration of a bluetooth receiver according to a third embodiment.

FIG. 11 is a block diagram showing a fragmentary configuration of a bluetooth receiver 1C according to the third embodiment. Components identical to and associated with those shown in FIG. 1 according to the first embodiment are respectively identified by the same reference numerals.

In FIG. 11, the bluetooth receiver 1C according to the third embodiment has a receiving antenna 2, an RFIC transceiver 3, a frequency drift correcting circuit 5, an FIFO buffer 6 and a synchronous word detecting circuit (word detecting circuit) 7, etc.

The receiving antenna 2, RFIC transceiver 3, frequency drift correcting circuit 5 and FIFO buffer 6 are similar to those employed in the first embodiment.

While the synchronous word detecting circuit 7 employed in the third embodiment also bears a synchronous word detecting function, it is different from one employed in the first embodiment and provided at a stage prior to the frequency drift correcting circuit 5.

The synchronous word detecting circuit 7 illustrated in the third embodiment adopts a so-called sliding correlator configuration. When each of 64-bit length synchronous words is developed in a baseband signal S1, the synchronous word detecting circuit 7 outputs a synchronous word detection phase S5 to the frequency drift correcting circuit 5.

The synchronous word detection phase S5 is phase information defined by a clock faster than a symbol transmission rate and corresponds to a change-point clock phase S2 in the first embodiment.

In other words, the synchronous word detecting circuit 7 employed in the third embodiment combines the function of the baseband signal sample clock extracting circuit employed in the first embodiment and the function of the synchronous word detecting circuit employed therein.

The frequency drift correcting circuit 5 illustrated in the third embodiment forms and outputs the post-correction change-point clock phase S3 employed in the first embodiment, based on the synchronous word detection phase S5 outputted from the synchronous word detecting circuit 7.

The FIFO buffer 6 employed in the third embodiment performs a clock put-to-change or transfer operation through writing and reading of the baseband signal S1 and bears a separation/output function of a payload S6.

Figure 12:
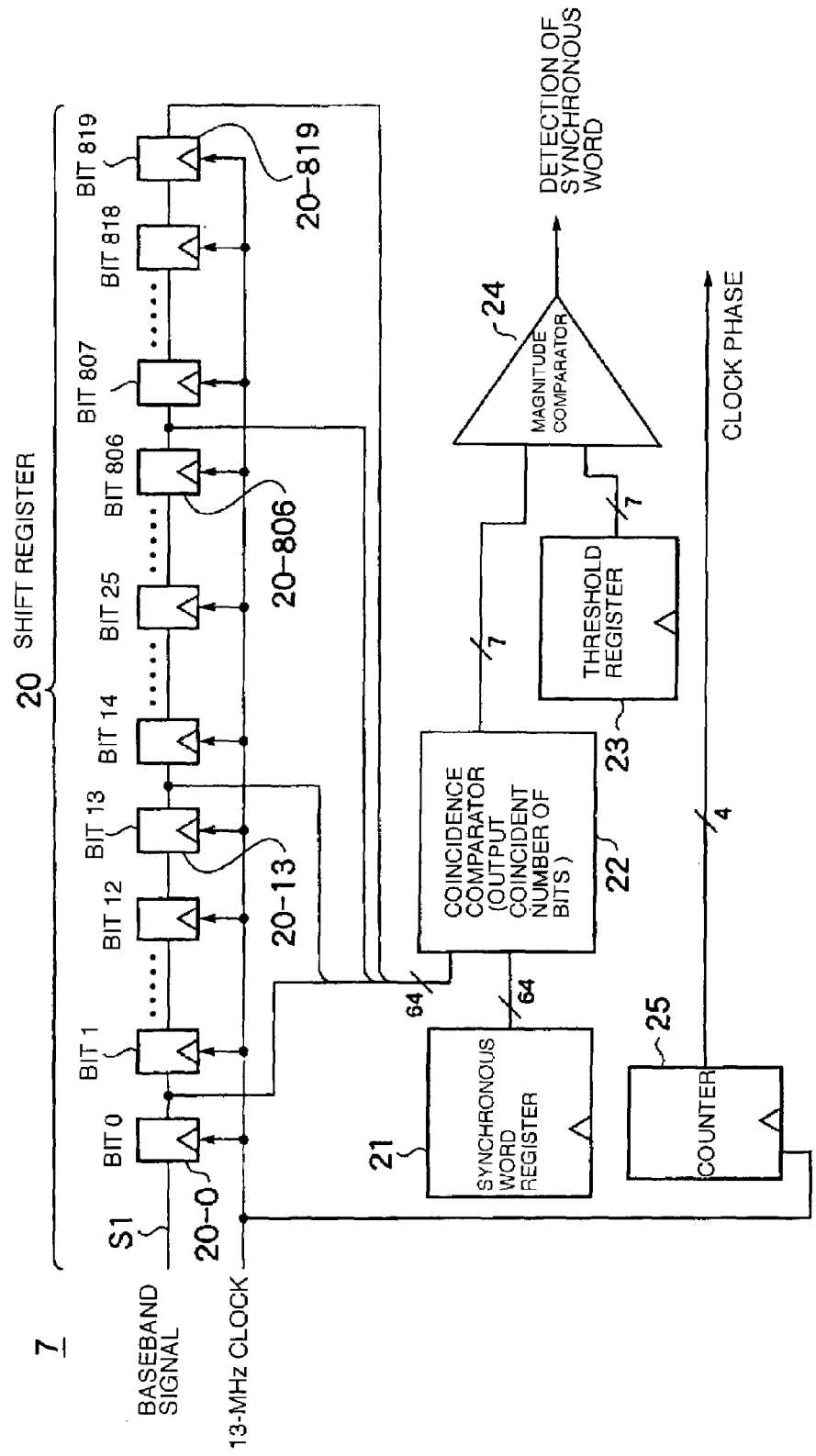
FIG. 12 is a block diagram depicting a detailed configuration of a synchronous word detecting circuit illustrated in the third embodiment.

FIG. 12 shows an example of a detailed configuration of the synchronous word detecting circuit 7 illustrated in the third embodiment. Components identical and corresponding to those in FIG. 9 according to the first embodiment are respectively identified by the same reference numerals.

In FIG. 12, the synchronous word detecting circuit 7 employed in the third embodiment also includes a shift register 20, a synchronous word register 21, a coincidence comparator 22, a threshold register 23 and a magnitude comparator 24 and has a clock phase counter 25.

The synchronous word register 21, the coincidence comparator 22, the threshold register 23 and the magnitude comparator 24 are similar to their corresponding ones of the first embodiment.

In the third embodiment, the shift register 20 to which a baseband signal S1 is inputted, is different from one employed in the first embodiment and has 820-bit lengths. A 13-MHz clock is inputted to respective register elements 20-1 through 20-819 for the purpose of shifting.

As described even in the first embodiment, the 13-MHz clock has a frequency equivalent to 13 times (N times) a symbol transmission rate 1 MHz. In the above-described 820 register-elements, 63 bits excluding the final bit for the 64-bit length synchronous words are set and shifted on the 13-MHz clock. It is therefore necessary to provide 63×13=819 register elements. In the final bit for the synchronous words, one register element may be provided because if the signal may be taken in on the 13-MHz clock at the minimum, then synchronous word detection can be executed. As a result, the number of stages in the shift register 20 has been set to 820 (the number of register elements has been set to 820).

Outputs (tap outputs) of the register elements corresponding to 64 in total, which comprise the first-stage register element 20-0 and the subsequent register elements 20-13, 20-26, . . . , 20-806 and 20-819 provided at intervals of 13 register elements, are inputted in parallel to the coincidence comparator 22.

The 13-MHz clock has the frequency equivalent to 13 times the symbol transmission rate 1 MHz. Therefore, when an ideal baseband signal S1 is inputted, the 13-by-13 shifted register elements 20-0, 20-13, 20-26, . . . , 20-806 and 20-819 corresponding to 64 in total, whose outputs are supplied to the coincidence comparator 22, temporarily store values of different symbol periods.

In other words, there are also produced timings provided to hold respective values of 64-bit length synchronous words by the 64 register elements 20-0, 20-13, 20-26, . . . , 20-806 and 20-819. Since one symbol period corresponds to 13 cycles of the 13-MHz clock, the synchronous words (whose respective values) are outputted from the 64 register elements 20-2, 20-13, 20-26, . . . , 20-806 and 20-819 in the maximum 13 cycles of the 13-MHz clock.

The synchronous word register 21, the coincidence comparator 22, the threshold register 23 and the magnitude comparator 24, which detect that the synchronous words have been retained in the 64 register elements 20-0, 20-13, 20-26, . . . , 20-806 and 20-819, are similar in operation to the first embodiment.

The clock phase counter 25 counts up on a cyclic basis in a range of "0" to "12" each time the 13-MHz clock arrives. A count (given in 4-bit representation because the maximum value is 12) of the counter 25 indicates the type of sample clock phase at that time.

Thus, the output of the clock phase counter 25 at the time that a synchronous word detect signal outputted from the magnitude comparator 24 is made significant, is recognized to thereby make it possible to grasp at which clock phase the corresponding synchronous word is detected.

When the synchronous word detect signal of the magnitude comparator 24 becomes significant over a predetermined cycle interval of one symbol section (the number of clock cycles of 13) to eliminate the influence of noise contained in the baseband signal S1 and the influence of a frequency drift in the case of the third embodiment, the corresponding synchronous word is regarded as being detected for the first time. When a 5-cycle interval is selected as the predetermined cycle interval, for example, the corresponding synchronous word can be detected even if a frequency drift of (13-5) cycles (about 0.6 μs) is developed for a synchronous word section (64 μs) of 64 symbols.

While the present embodiment shows the case in which when the synchronous word detect signal is continuously significant over the predetermined cycle interval (over 5 cycles), the corresponding synchronous word has been regarded as being detected, a condition of a predetermined cycle proportion may be set up as an alternative to it or in addition to it. If, for example, a condition like "6 cycles in 8 cycles" is provided, then the corresponding synchronous word can be regarded as having been detected even where 5 cycles are not continuous and even when 4 cycles are significant, one cycle is insignificant, and thereafter 2 cycles are significant.

Figure 13:
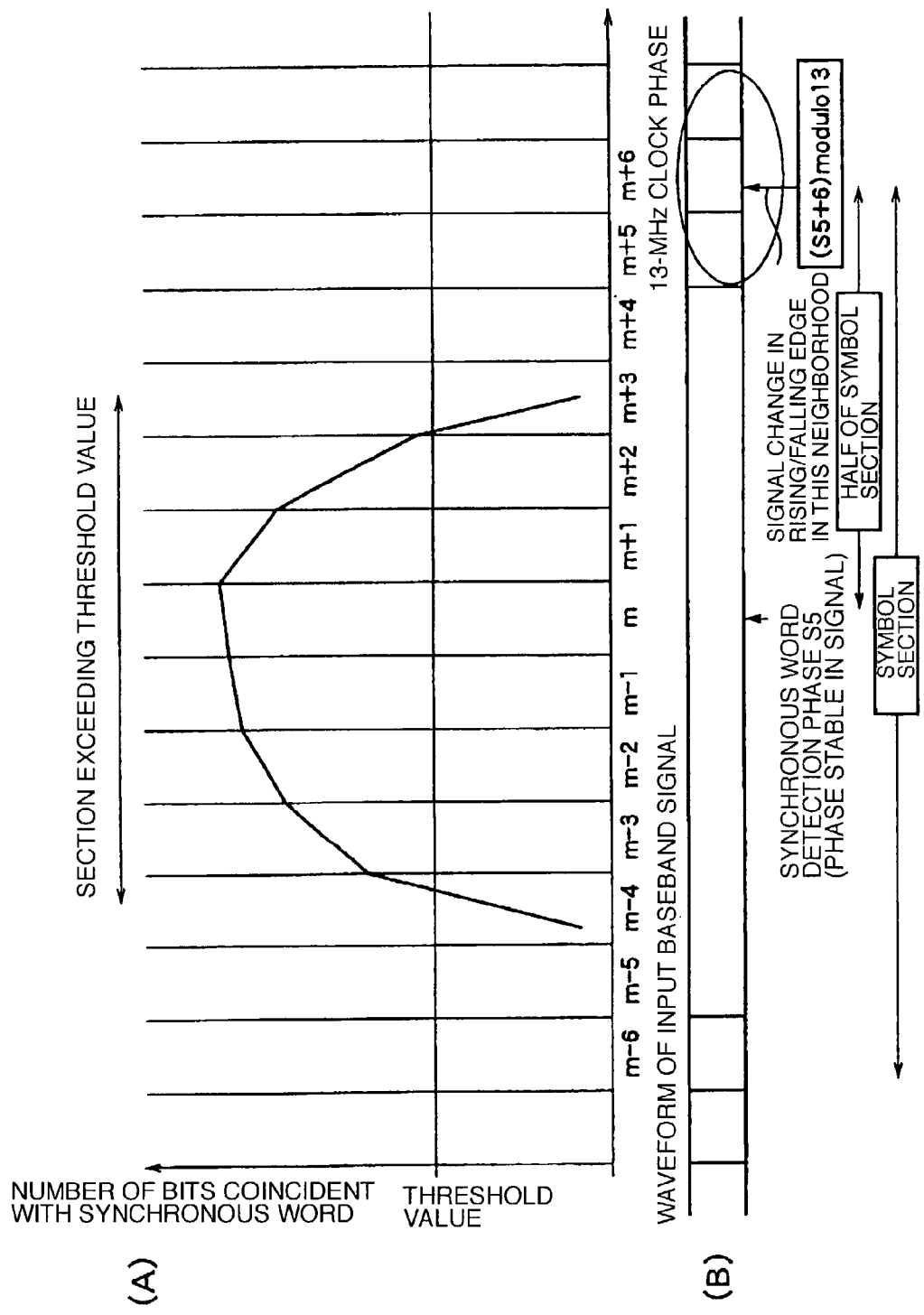
FIG. 13 is a diagram for describing an operation of the synchronous word detecting circuit described in the third embodiment.

FIG. 13 is an explanatory view showing the manner in which when synchronous words occur in a baseband signal S1, the synchronous words are detected during plural cycle intervals.

A vertical axis shown in FIG. 13(A) indicates the number of coincidence bits outputted from the coincidence comparator 22. A threshold value corresponds to a threshold value stored in the threshold register 23. A horizontal axis shown in FIG. 13(A) indicates a count of the clock phase counter 25. A range shown in FIG. 13(A) indicates the back and forth of the timing provided to hold part of the baseband signal S1 corresponding to the final symbol for the synchronous words by the first-stage register element 20-0 in the shift register 20.

One symbol section corresponds to a period in which the number of clock pulses in the 13-MHz clock is generated as 13 or 12. Even in the final symbol section of the synchronous words, the 13 or 12 clock pulses are generated.

The timing provided to allow the first-stage register element 20-0 of the shift register 20 to firstly hold the final symbol for the synchronous words, based on the clock pulses of the 13-MHz clock is close to the timing for the boundary between symbols in the baseband signal S1. Each of other register elements 20-13, 20-26, . . . , 20-806 and 20-819, which supply their outputs to the coincidence comparator 22, also holds the level of the baseband signal S1, which is close to the timing for the boundary between the symbols. The boundary between the symbols produces many rising and falling changes. Due to a slight phase shift, 64 bits outputted to the coincidence comparator 22 might not reach the proper 64 bits of the synchronous word sequence.

Similarly, the timing provided to cause the first-stage register element 20-0 of the shift register 20 to finally hold the final symbol for the synchronous words, based on the clock pulses of the 13-MHz clock is also close to the timing for the boundary between the symbols in the baseband signal S1. Each of other register elements 20-13, 20-26, . . . , 20-806 and 20-819, which supply their outputs to the coincidence comparator 22, also holds the level of the baseband signal S1, which is close to the timing for the boundary between the symbols. Even in this case, 64 bits outputted to the coincidence comparator 22 might not be brought to the proper 64 bits of the synchronous word sequence.

Namely, the level of the final symbol for the synchronous words produced in the baseband signal S1, is not held stably over a whole range described as the symbol section in FIG. 13. As shown in FIG. 13(B), the level is kept stable for a section in which the back and forth of the one symbol section are rendered short slightly. Other symbols for the synchronous words are similar.

Thus, the number of coincidence bits of the coincidence comparator 22 exceeds the threshold value stored in the threshold register 23 in the case of a plurality of central clock phases m−3, m−2, m−1, m, m+1 and m+2 of 13 or 12 clock phases defined by the 13-MHz clock in the final symbol section for the synchronous words.

In the third embodiment, the synchronous word detecting circuit 7 supplies a clock phase (m in FIG. 13) at an intermediate point of the section in which the number of coincidence bits of the coincidence comparator 22 exceeds the number of threshold coincidence bits stored in the threshold register 23, to the frequency drift correcting circuit 5 as a synchronous word detect phase S5 (see FIG. 11) of the baseband signal S1. The synchronous word detect phase S5 is position information indicating in which clock phase in one symbol section the degree of coincidence with the synchronous word reaches the maximum, and is capable of taking values from 0 to 12.

While the illustration of components for determining the synchronous word detect phase S5 is omitted in FIG. 12, the synchronous word detect phase S5 is obtained by the method described using FIG. 13, based on the output of the magnitude comparator 24 and the output of the clock phase counter 25.

A configuration for sampling each symbol in the baseband signal S1 is basically set up by performing its sampling with the synchronous word detect phase S5 as a base.

Incidentally, after the completion of the synchronous word detection, the synchronous word detect circuit 7 may preferably be deactivated to reduce power consumption until the following synchronous word detection request is issued.

The frequency drift correcting circuit 5 employed in the third embodiment starts to operate after the completion of the synchronous word in the above-described manner, for example. The frequency drift correcting circuit 5 corrects a change-point clock phase (see S2 in the first embodiment) indirectly defined by the synchronous word detect phase S5 outputted from the synchronous word detecting circuit 7 while referring to the rising and falling change points of the input baseband signal S1.

Here, the synchronous word detect phase S5 is considered to show a clock phase (the center of one symbol section) of one symbol section (13 clock sections or intervals ranging from 0 to 12), in which the input baseband signal S1 is stablest and the possibility of its change is low. Thus, a clock phase having a high possibility of the rising or falling change point of the input baseband signal S1 is determined according to the following expression:

(synchronous word detect phase S5+6) modulo 13

Incidentally, one symbol section is equal to a section of 13 cycles of the 13-MHz clock, and a section from the center of one symbol section to its end is equivalent to 6.5 cycles. However, since the section must be handled as an integral number, 6 cycles are adopted as the section. Even if the value indicative of a phase after having been shifted by 6 cycles exceeds 13, a modulo process is performed to substitute it with the range of 0~12 each indicative of the clock phase.

When the corresponding synchronous word is detected by the synchronous word detecting circuit 7, the change-point clock phase (equivalent to the change-point clock phase S2 in the first embodiment) corresponding to the output of the frequency drift correcting circuit 5 is initially set to the clock phase determined by the above expression.

The frequency drift correcting circuit 5 takes into consideration a frequency drift, corrects the initially-set change-point clock phase and outputs the post-correction change-point clock phase S3 to the FIFO buffer 6.

Since the method of allowing the frequency drift correcting circuit 5 to correct the initially-set change-point clock phase and thereby obtain the post-correction change-point clock phase S3 while referring to the rising and falling change points of the input baseband signal S1 is similar to the method in which the frequency drift correcting circuit 5 employed in the first embodiment has been described using FIGS. 4 through 8, the description thereof will be omitted.

The corrected change-point clock phase S3 is sent to the FIFO buffer 6 for temporarily storing the result of sampling of the baseband signal S1.

Here, the post-correction change-point clock phase S3 indicates the phase of a change point of a symbol. Since the baseband signal S1 is sampled in the phase in which the symbol is stable and has a potential for its less change, its sample is set to a midway point between the post-correction change-point clock phase S3 and the following change-point clock phase S3. When sampling is made on the 13-MHz clock, the phase for the sampling of the baseband signal S1 is set to the following value, for example:

(post-correction change-point clock phase S3+7) modulo 13

Here, 7 is added to the post-correction change-point clock phase S3 to determine or obtain a midway point between the post-correction change-point clock phase and the following change-point phase (after 13 clock cycles). Since the 6.5 cycles equivalent to one-half the 13 cycles are regarded as the 6 cycles upon the above conversion from the symbol stable point to its change point, the 6.5 cycles are set so as to be regarded as 7 cycles here.

The baseband signal S1 is sampled with the clock phase determined by the above expression and stored in the FIFO buffer 6. The FIFO buffer 6 waits for the first storage of 5 symbols of a payload part after the detection of a synchronous word. When the number of the stored symbols reaches 5, the FIFO buffer 6 outputs the contents of the leading symbol read therefrom, as a payload signal S6.

Subsequently, the frequency drift correcting circuit 5 calculates a change-point clock phase S3 in synchronism with the baseband signal S1. The output of the payload S6 from the FIFO buffer 6 is performed in sync with an internal clock of 1 MHz.

According to the third embodiment, since the sliding correlation between the baseband signal and each synchronous word is first obtained and the correlation is established with the sample phase near the maximum value as the detection phase of the synchronous word, the detection of the synchronous word resistant to noise can be carried out.

Since the correlation is established with the detection phase of each synchronous word corresponding to the sample phase near the maximum value being regarded as sample phase of the subsequent payload, payload sampling can be also performed with accuracy.

Further, since the frequency drift contained in the input baseband signal is corrected upon payload reception, reception resistant even to the frequency drift is allowed even upon the payload reception.

Furthermore, since the synchronous word detecting circuit and the frequency drift correcting circuit are selectively operated, power consumption can be suppressed.

A fourth embodiment in which a baseband signal receiving circuit and a word detecting circuit according to the present invention are applied to a bluetooth receiver, will next be explained in detail with the drawings.

As compared with the third embodiment, the fourth embodiment is different therefrom only in a detailed configuration of the synchronous word detecting circuit 7. Namely, while the synchronous word detecting circuit employed in the third embodiment is one in which the shift register is used as the configuration for holding the capturing of the input baseband signal and performing its parallel output, the synchronous word detecting circuit employed in the fourth embodiment takes a configuration wherein SRAM macros are used to cut down the amount of hardware and reduce power consumption. A configuration around the synchronous word detecting circuit 7 is similar to the third embodiment and identical to FIG. 11 referred to above.

Figure 14:
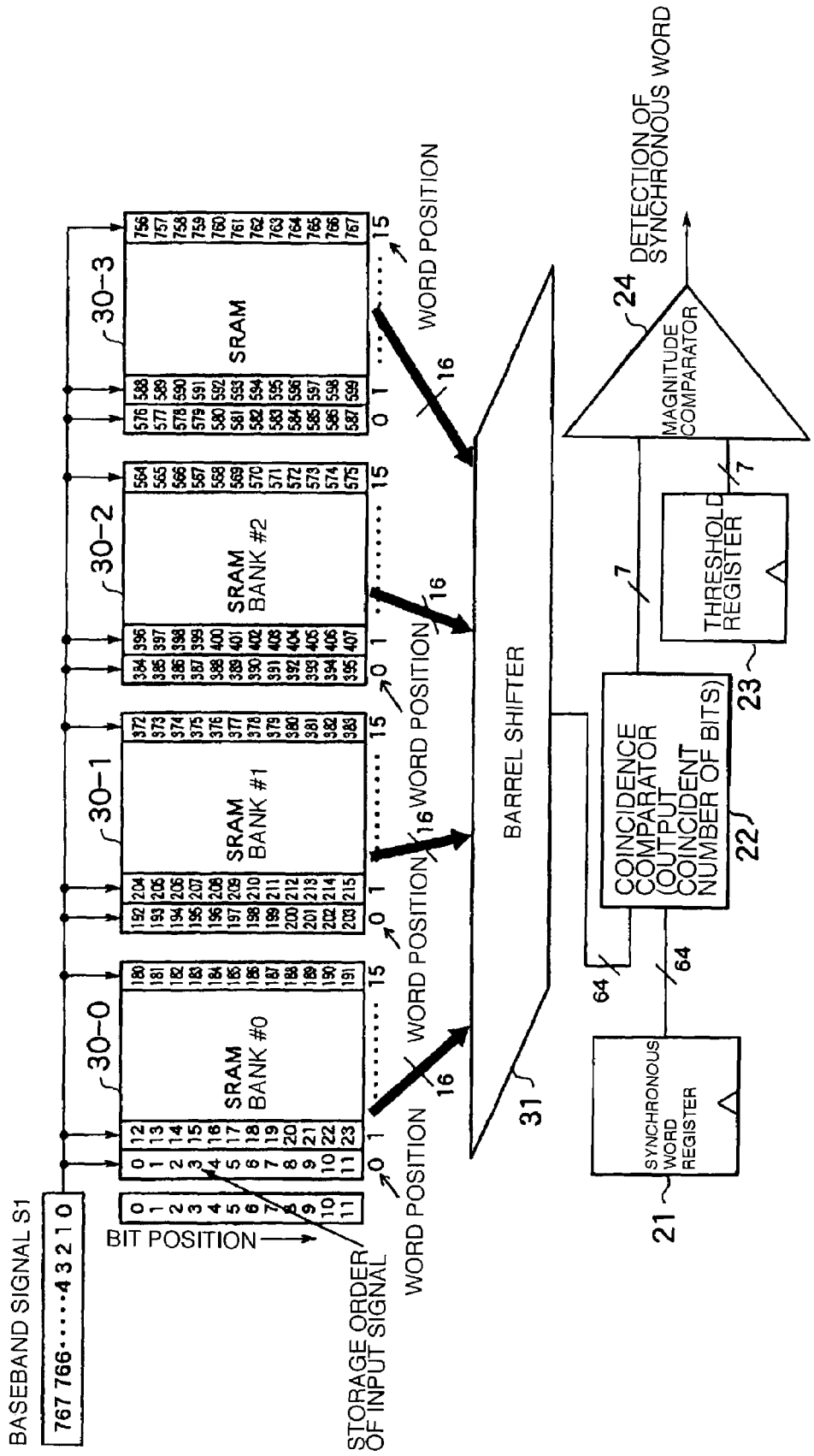
FIG. 14 is a block diagram showing a detailed configuration of a synchronous word detecting circuit illustrated in a fourth embodiment.

FIG. 14 is a block diagram showing a detailed configuration of the synchronous word detecting circuit 7 illustrated in the fourth embodiment. Components identical and corresponding to those shown in FIG. 12 according to the third embodiment are identified by the same reference numerals. Incidentally, a clock phase counter 25 is omitted in FIG. 14. FIG. 14 is an example in which a frequency of 12 MHz is used as a sample clock (12-MHz clock corresponds to the 13-MHz clock employed in the third embodiment).

In FIG. 14, the synchronous word detecting circuit 7 of the fourth embodiment is provided with four SRAM blocks (SRAM banks) 30-0 through 30-3 from a bank #0 to a bank #3, for storing respective bits of an input baseband signal S1, and a barrel shifter 31 for arranging in line 64 bits read from these SRAM banks 30-0 through 30-3 from the old ones to the new ones. The synchronous word detecting circuit 7 is configured so that the 64 bits outputted from the barrel shifter 31 are inputted to a coincidence comparator 22.

Each of the SRAM banks 30-0, . . . , 30-3 has a storage or memory position (bit position) specified by a bit position of any of values 0 through 11 and a word position which takes any of values 0 through 15.

The input baseband signal S1 is sampled with a 12-MHz clock and the sampled bits are sequentially stored in the four SRAM banks 30-0 through 30-3.

After a synchronous word detecting process has been started, the order of positions for the stored bits is as follows:

The contents of bit positions (16*12*i+j+12*k) of the baseband signal S1 is stored in the SRAMi (j, k). Here the SRAMi (j, k) indicates a bit position of a word k for a bit j of a SRAM bank i. However, $0 \leq i \leq 3$, $0 \leq j \leq 11$ and $0 \leq k \leq 15$. Incidentally, when the bit positions of the baseband signal S1 reach 768 or more, they are stored at positions regarded as values in a range of 0~767 according to a process of a modulo 768.

Specific storage positions are represented as shown in FIG. 14. Namely, the storage of the bit 0 at its corresponding bit position of SRAM 0 (0, 0) is started. Then the bits are sequentially stored in their corresponding bit positions in a raster scan form as viewed in a vertical direction. After the bit 767 of the baseband signal S1 has been stored in its corresponding bit position of SRAM 3 (11, 15), the bit storage is returned to storage from the bit position of SRAM 0 (0, 0) again subsequently to the bit 768 of the baseband signal S1.

Incidentally, when ones in which write enable control ever bits do not exist, are applied as SRAMs, it is necessary to read the contents of a word k in a bank i once, substitute it with the result of sampling of the baseband signal S1 and write the contents of the word. At this time, the synchronous word detecting circuit may be controlled so as to use 24 MHz equivalent to twice a 12 MHz as a clock frequency for each SRAM (clock frequency related to the detection of a synchronous word: 12 MHz even in this case), perform reading of data from the SRAM in an even cycle and perform writing of data into the SRAM in an odd cycle.

When the bit position at the baseband signal S1 has reached 756 equivalent to a word 15 corresponding to a bit 0 in the bank 3 for the first time, a synchronous word coincidence comparing process is started.

Incidentally, when the bit positions at the baseband signal S1 take up to 755, data different from one another by 12 clock cycles cannot be taken out in the form of 64 bits and hence the synchronous word coincidence comparing process is not executed.

Upon the above-described start, data (0, 12, . . . , 180, 192, . . . , 373, 384, . . . , 564, 576, . . . , 756) of 64 bits related to the values 0 of bit positions j in memory areas attempted to carry out storage from now are read from all the memory banks 30-0 through 30-3 in the banks 0 to 3. The contents of the word 15 (756) at the bit 0 in the bank 3 is substituted with the contents of a sample bit of the baseband signal S1, which in turn is outputted to the barrel shifter 31. Further, the contents of the word 15 at the bit 0 in the bank 3 is updated to its corresponding substituted one. Incidentally, when the SRAM does not support bit enable control, the contents (intended for the word 15 at the bit 0) of read data of the bank 3 updated in the next cycle is written into the bank 3.

The barrel shifter 31 basically left-shifts (turn-shift to the left side) data of 64 bits (including substituted one bit) from the memory banks 30-0 through 30-3 with the value of a (16*i+k+1) modulo 64 as the amount of shift and outputs the same to the coincidence comparator 22. Since i is 3 and k is 15 at this time, the amount of shift results in 0 and the barrel shifter 31 outputs the 64 bits sent from the memory banks 30-0 through 30-3 to the coincidence comparator 22 without being left-shifted.

The 12-MHz clock has a frequency equivalent to 12 times the symbol transmission rate 1 MHz herein. Therefore, if an ideal baseband signal S1 is inputted, then 12-by-12 shifted data 0, 12, ..., 756 equivalent to 64 bits in total, which are supplied to the coincidence comparator 22 as outputs, result in values of different symbol periods.

In other words, there are also produced timings in which the 64-bit data 0, 12, ..., 756 outputted from the memory banks 30-0 through 30-3 respectively assume respective values of synchronous words having 64-bit lengths. Sine one symbol period corresponds to 12 cycles of the 12-MHz clock, the 64-bit data from the memory banks 30-0 through 30-3 respectively assume the respective values of the synchronous words of the 64-bit lengths in the maximum 12 cycles of the 12-MHz clock.

Even when data of 757~767 in which the bit positions in the baseband signal S1 correspond to other bits 1 through 11 at the word 15 in the bank 3, are inputted, each of the memory banks 30-0 through 30-3 reads 64-bit data related to a bit position j in the corresponding bank, substitutes only the corresponding one bit at the word 15 in the bank 3 with its corresponding value of the baseband signal S1, and outputs it to the barrel shifter 13, followed by re-storage in the memory bank (30-3).

Even at this time, the barrel shifter 31 left-shifts (turn-shifts to the left side) data of 64 bits (including substituted one bit) from the memory banks 30-0 through 30-3 with the value of a (16*i+k+1) modulo 64 as the amount of shift (0 in this case) and outputs the same to the coincidence comparator 22.

Next consider where data of 768 in which the bit position in the baseband signal S1 is equivalent to a bit 0 at a word 0 in the bank 0, is inputted.

Even at this time, all the memory banks 30-0 through 30-3 of the banks 0 to 3 respectively read data (0, 12, ..., 180, 192, ..., 373, 384, ..., 564, 576, ..., 756) of 64 bits related to the values 0 of bit positions j in memory areas attempted to carry out storage from now. The contents of the word 0 (bit position 0 in the baseband signal) at the bit 0 in the bank 0 is replaced with the contents (bit position 768 in the baseband signal S1) of a sample bit of the baseband signal S1, which in turn is outputted to the barrel shifter 31. Further, the contents of the word 0 at the bit 0 in the bank 0 is updated to its corresponding substituted one.

Even at this time, the barrel shifter 31 left-shifts (turn-shifts to the left side) data of 64 bits (including substituted one bit) from the memory banks 30-0~30-3 with the value of a (16*i+k+1) modulo 64 as the amount of shift and outputs the same to the coincidence comparator 22. Since i is 0 and k is 0 at this time, the amount of shift results in 1 and the barrel shifter 31 left-shifts the 64 bits sent from the memory banks 30-0 through 30-3 by one bit and outputs the same to the coincidence comparator 22.

Owing to such a left-shift process, the data at the bit position 768 of the baseband signal S1, which has been placed in the position of MSB, is shifted to the position of LSB. Thus, the sequence of 64 bits is represented in the form of 12, ..., 180, 192, ..., 373, 384, ..., 564, 576, ..., 756 and 768 as viewed from the MSB side and hence they result in ones proper in time sequence, followed by input to the coincidence comparator 22.

Even when data in which the bit positions in the baseband signal S1 are 769 and later ones, are inputted, the memory banks are operated according to the values of i, j and k while the contents of i, j and k are being updated as described above.

Although not shown definitely in FIG. 14, a memory control circuit for effecting such memory control as referred to above on the memory banks (SRAM banks) 30-0 30-3 is provided.

Even by the fourth embodiment, an advantageous effect similar to the third embodiment can be brought about.

According to the fourth embodiment, such a large number of shift registers as applied to the synchronous word detecting circuit employed in the third embodiment become unnecessary and the SRAM macros are used as an alternative to them. Therefore, a further reduction in power consumption and scale-down of a hardware size can be expected.

While the clock extracting circuit 4 employed in the first embodiment determines the change-point clock phase S2, based on the number of change points, the change-point clock phase S2 may be determined based on such other information as normalized by dividing the number of change points by a period, for example. The searching of the change-point clock phase S2 may also be stopped when the maximum number of change points reaches a predetermined number of change points.

If such a receiver as being capable of omitting the frequency drift correcting circuit, is adopted, then the output produced from the clock extracting circuit 4 may use a clock phase per se to be sampled without using a change-point clock phase.

While each of the embodiments has shown one in which the present invention is applied to the reception configuration of the baseband signal in the bluetooth, the objects to which the present invention is applied, are not limited to the bluetooth receivers. The present invention can be applied even to other receivers each including a circuit for receiving a baseband signal of serial data, and a transmission line thereof is not limited to or by radio transmission either.

If the present invention is applied to a communication system in which a frequency drift presents no problem, then the frequency drift correcting circuit can be omitted. Further, the FIFO buffer can be omitted in a communication system or the like which needs no clock transfer.

The baseband signal sample clock extracting circuit described in the first embodiment can be applied as clock extracting circuits of various serial data receivers.

Similarly, the configurations of the synchronous word detecting circuits described in the third and fourth embodiments can be applied to a receiver using serial data including predetermined words (which may be ones for the purpose of applications other than for synchronization) as part as well as to the purpose of the detection of each synchronous word.

According to the present invention as described above, there can be provided a baseband signal receiving circuit capable of properly restoring symbols of a baseband signal (serial signal), and circuits (sample clock extracting circuit and word detecting circuit) suitable for application to the baseband signal receiving circuit.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A sample clock extracting circuit, comprising:
    a number-of-change point memory that stores a cumulative number of change points of an input baseband signal at every N type of clock phases of a sample clock, each clock phase having a frequency equivalent to N times a symbol transmission rate of the input baseband signal, wherein N is an integer greater than or equal to 2;
    a number-of-change point updating circuit that updates the cumulative number of change points stored in the number-of-change point memory for a clock phase related to a timing when a rising change point or a falling change point occurs in the baseband signal; and
    an output clock phase determining circuit that determines a clock phase directly or indirectly indicative of a sample clock phase for the baseband signal based on the cumulative number of change points stored in the number-of-change point memory.

2. A sample clock extracting circuit according to claim 1, wherein the number-of-change point memory includes a plurality of registers that respectively store the cumulative number of change points at the clock phases of the sample clock.

3. A sample clock extracting circuit according to claim 2, wherein the number-of-change point memory further includes a counter, a decoder and a multiplexer.

4. A sample clock extracting circuit according to claim 1, wherein the number-of-change point updating circuit includes a multiplexer.

5. A sample clock extracting circuit according to claim 1, wherein the output clock phase determining circuit includes a comparator.

6. A baseband signal receiving circuit, comprising:
    a sampling circuit for sampling an input baseband signal at a given clock phase at N type of clock phases of a sample clock, each clock phase having a frequency equivalent to N times a symbol transmission rate of the baseband signal, wherein N is an integer greater than or equal to 2; and
    a sample clock extracting circuit having
        a number-of-change point memory that stores a cumulative number of change points of an input baseband signal at every N type of the clock phases;
        a number-of-change point updating circuit that updates the cumulative number of change points stored in the number-of-change point-memory for a clock phase related to a timing when a rising change point or a falling change point occurs in the baseband signal; and
        an output clock phase determining circuit that determines a clock phase directly or indirectly indicative of a sample clock phase for the baseband signal based on the cumulative number of change points stored in the number-of-change point memory.

7. The baseband signal receiving circuit according to claim 6, further comprising a frequency drift correcting circuit, interposed between the sample clock extracting circuit and the sampling circuit, that corrects the clock phase output from the sample clock extracting circuit based on a frequency drift mixed in the baseband signal and supplies the corrected clock phase to the sampling circuit.

8. The baseband signal receiving circuit according to claim 6, wherein the sampling circuit is an FIFO buffer that performs sampling in the clock phase determined from the baseband signal and holds a result of the sampling therein, and that reads the baseband signal based on a clock signal formed independently of the baseband signal.

9. The baseband signal receiving circuit according to claim 6, further including a synchronous word detecting circuit that detects each of synchronous words included in the baseband signal, based on a clock signal equal to the symbol transmission rate of the baseband signal.

10. A word detecting circuit comprising:
    a high-speed sampling data memory that sequentially stores data obtained by sampling a baseband signal with a sample clock at a clock frequency equivalent to N times a symbol transmission rate of the baseband signal, wherein N is an integer greater than or equal to 2;
    a data taking-out circuit that takes out data from the data stored in the high-speed sampling data memory in parallel by a number equal to a number of bits of a predetermined word and such that data prior to and subsequent to each other have a time difference developed therebetween corresponding to N clocks of the clock frequency;
    a coincidence/non-coincidence comparing circuit that detects coincidence and non-coincidence between respective bits of the taken-out data and respective bits of the predetermined word, to provide as an output a number of respective bits that coincide; and
    a word detector that determines whether the predetermined word has been detected and a detection phase at the detection of the predetermined word from N types of clock phases of the sample clock, based on the output of the coincidence/non-coincidence comparing circuit.

11. The word detecting circuit according to claim 10, wherein the word detector makes a decision as to whether the number of respective bits of the predetermined word and the taken-out data that coincide is greater than a threshold value.

12. The word detecting circuit according to claim 11, wherein the word detector determines that the predetermined word has been detected, when a clock phase greater than the threshold value is rendered continuous over a predetermined number of cycles or more, and determines an intermediate phase of the cycles as a detection phase.

13. A baseband signal receiving circuit comprising:
    a sampling circuit for sampling an input baseband signal at a given clock phase at N type of clock phases of a sample clock, each clock phase having a frequency equivalent to N times a symbol transmission rate of the baseband signal, wherein N is an integer greater than or equal to 2; and
    a word detecting circuit including
        a high-speed sampling data memory that sequentially stores data obtained by sampling the baseband signal at a clock frequency equivalent to N times the symbol transmission rate of the baseband signal;
        a data taking-out circuit that takes out data from the data stored in the high-speed sampling data memory in parallel by a number equal to a number of bits of a predetermined word and such that data prior to and subsequent to each other have a time difference developed therebetween corresponding to N clocks of the clock frequency;
        a coincidence/non-coincidence comparing circuit that detects coincidence and non-coincidence between respective bits of the taken-out data and respective bits of the predetermined word, to provide as an output a number of respective bits that coincide; and a word detector that determines whether the predetermined word has been detected and a detection phase at the detection of the predetermined word from the N types of clock phases of the sample clock, based on the output of the coincidence/non-coincidence comparing circuit.

14. The baseband signal receiving circuit according to claim 13, wherein the word detector makes a decision as to whether the number of respective bits of the predetermined word and the taken-out data that coincide is greater than a threshold value.

15. The baseband signal receiving circuit according to claim 14, wherein the word detector determines that the predetermined word has been detected, when a clock phase greater than the threshold value is rendered continuous over a predetermined number of cycles or more, and determines an intermediate phase of the cycles as a detection phase.

* * * * *